(12) United States Patent
Hale et al.

(10) Patent No.: US 7,787,965 B2
(45) Date of Patent: Aug. 31, 2010

(54) MANAGEMENT OF THE FLOW OF PERSONS IN ENTERTAINMENT ENVIRONMENTS

(75) Inventors: Gregory B. Hale, Orlando, FL (US); Dale A. Stafford, Windermere, FL (US); Andrew Schwalb, Mt. Dora, FL (US); Barry Thomas Craven, Windermere, FL (US); Kenneth W. Schweizer, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 1582 days.

(21) Appl. No.: 10/875,096

(22) Filed: Jun. 22, 2004

(65) Prior Publication Data

US 2005/0060173 A1     Mar. 17, 2005

Related U.S. Application Data

(63) Continuation-in-part of application No. 09/617,721, filed on Jul. 17, 2000, now Pat. No. 6,889,098, which is a continuation-in-part of application No. 09/372,405, filed on Aug. 10, 1999, now Pat. No. 6,173,209, application No. 10/875,096, which is a continuation-in-part of application No. 10/687,191, filed on Oct. 15, 2003, and a continuation-in-part of application No. 10/687,243, filed on Oct. 15, 2003, now Pat. No. 7,047,205, and a continuation-in-part of application No. 10/687,226, filed on Oct. 15, 2003, and a continuation-in-part of application No. 10/687,190, filed on Oct. 15, 2003.

(51) Int. Cl.
| | |
|---|---|
| G05B 11/01 | (2006.01) |
| G05B 13/02 | (2006.01) |
| G05B 9/02 | (2006.01) |
| G06Q 10/00 | (2006.01) |
| G01C 21/34 | (2006.01) |
| G01C 21/36 | (2006.01) |
| G08B 5/22 | (2006.01) |

(52) U.S. Cl. ............................. 700/17; 700/18; 700/19; 700/20; 700/28; 700/79; 340/825.28; 340/825.29; 705/5; 705/6

(58) Field of Classification Search ................. 705/5–6; 700/17–20, 28, 79; 340/825.28, 825.29
See application file for complete search history.

(56) References Cited

U.S. PATENT DOCUMENTS 3,893,097 A    7/1975 Lach et al.

(Continued)

FOREIGN PATENT DOCUMENTS

DE           1006392 A3    8/1994

(Continued)

*Primary Examiner*—Ronald D Hartman, Jr.
(74) *Attorney, Agent, or Firm*—Greenberg Traurig, LLP

(57) ABSTRACT

A method and system for the loading of patrons at multiple attractions at an entertainment environment includes the first-in first-out line and a priority based line. A patron can have an additional priority entry at a time selected by the patron to any one of the multiple attractions in the entertainment environment. There can be an entry selected by the patron to at least one of the multiple attractions in the entertainment environment, such entry being affected on a priority basis as selected by the patron. A patron can have an entry at a second time period selected by the patron to the second attraction in the entertainment environment. The second time period can overlap a first time period. Alternatively the second time period can be substantially close in time to the first time period, whereby the closeness in time under essentially normal conditions would be too close for use on a first attraction in the first time period and subsequent use on a second attraction in that second time period. There can be an additional entry at a time selected by the patron to at least one of multiple attractions in the entertainment environment. The additional entry can be at selected return times to multiple attractions and at available return times selected by the computer for the multiple attractions.

21 Claims, 15 Drawing Sheets

U.S. PATENT DOCUMENTS

| | | | |
|---|---|---|---|
| 3,998,570 | A | 12/1976 | Jacobs |
| 4,081,669 | A | 3/1978 | Klingman |
| 4,086,475 | A | 4/1978 | Churchill |
| 4,095,739 | A | 6/1978 | Fox et al. |
| 4,097,727 | A | 6/1978 | Ulch |
| 4,247,759 | A | 1/1981 | Yuris et al. |
| 4,298,793 | A | 11/1981 | Melis et al. |
| 4,398,257 | A | 8/1983 | Paganini et al. |
| 4,512,667 | A | 4/1985 | Doulton et al. |
| 4,538,056 | A | 8/1985 | Young et al. |
| 4,598,275 | A | 7/1986 | Ross et al. |
| 4,752,776 | A | 6/1988 | Katzenstein |
| 4,780,599 | A | 10/1988 | Baus |
| 4,802,218 | A | 1/1989 | Wright et al. |
| 4,816,658 | A | 3/1989 | Khandwala et al. |
| 4,818,998 | A | 4/1989 | Apsell et al. |
| 4,889,981 | A | 12/1989 | Harbers |
| 5,006,983 | A | 4/1991 | Wayne et al. |
| 5,038,290 | A | 8/1991 | Minami |
| 5,066,853 | A | 11/1991 | Brisson |
| 5,134,720 | A | 7/1992 | Gamgee et al. |
| 5,210,786 | A | 5/1993 | Itoh |
| 5,245,163 | A | 9/1993 | Yehuda |
| 5,287,269 | A | 2/1994 | Dorrough et al. |
| 5,305,197 | A | 4/1994 | Axler et al. |
| 5,317,318 | A | 5/1994 | Thomas et al. |
| 5,367,330 | A | 11/1994 | Haave |
| 5,408,417 | A | 4/1995 | Wilder |
| 5,429,361 | A | 7/1995 | Raven et al. |
| 5,455,851 | A | 10/1995 | Chaco et al. |
| 5,461,371 | A | 10/1995 | Matsumoto et al. |
| 5,465,115 | A | 11/1995 | Conrad et al. |
| 5,491,326 | A | 2/1996 | Marceau et al. |
| 5,502,806 | A | 3/1996 | Mahoney et al. |
| 5,541,835 | A | 7/1996 | Dextraze et al. |
| 5,655,053 | A | 8/1997 | Renie |
| 5,724,520 | A | 3/1998 | Goheen |
| 5,754,654 | A | 5/1998 | Hiroya et al. |
| 5,893,097 | A | 4/1999 | Hayata et al. |
| 5,905,521 | A | 5/1999 | Gatto |
| 5,929,848 | A | 7/1999 | Albukerk et al. |
| 5,940,510 | A | 8/1999 | Curry et al. |
| 5,946,444 | A | 8/1999 | Evans et al. |
| 5,948,040 | A | 9/1999 | DeLorme et al. |
| 5,966,654 | A | 10/1999 | Croughwell et al. |
| 5,978,770 | A | 11/1999 | Waytena et al. |
| 5,987,420 | A | 11/1999 | Maeda et al. |
| 5,987,421 | A | 11/1999 | Chuang |
| 6,094,640 | A | 7/2000 | Goheen |
| 6,154,818 | A | 11/2000 | Christie |
| 6,167,443 | A | 12/2000 | Decker et al. |
| 6,173,209 | B1 | 1/2001 | Laval et al. |
| 6,208,976 | B1 | 3/2001 | Kinebuchi et al. |
| 6,216,227 | B1 | 4/2001 | Goldstein et al. |
| 6,260,027 | B1 | 7/2001 | Takahashi et al. |
| 6,263,088 | B1 | 7/2001 | Crabtree et al. |
| 6,329,919 | B1 | 12/2001 | Boies et al. |
| 6,363,351 | B1 | 3/2002 | Moro |
| 6,374,176 | B1 | 4/2002 | Schmier et al. |
| 6,424,623 | B1 | 7/2002 | Borgstahl et al. |
| 6,454,174 | B1 | 9/2002 | Sansone |
| 6,463,534 | B1 | 10/2002 | Geiger et al. |
| 6,490,409 | B1 | 12/2002 | Walker |
| 6,529,786 | B1 | 3/2003 | Sim |
| 6,775,518 | B2 | 8/2004 | Norcott et al. |
| 6,813,608 | B1 | 11/2004 | Baranowski |
| 2001/0016825 | A1 | 8/2001 | Pugliese et al. |
| 2002/0007292 | A1 | 1/2002 | Paxton et al. |
| 2002/0116233 | A1 | 8/2002 | Kuge |
| 2002/0116235 | A1 | 8/2002 | Grimm et al. |
| 2003/0023463 | A1 | 1/2003 | Dombroski et al. |
| 2003/0055689 | A1 | 3/2003 | Block et al. |
| 2005/0045710 | A1 | 3/2005 | Burke |

FOREIGN PATENT DOCUMENTS

| | | |
|---|---|---|
| EP | 0086199 B1 | 4/1987 |
| EP | 1076319 A1 | 2/2001 |
| FR | 2612669 | 9/1988 |
| FR | 2650095 | 1/1991 |
| FR | 2805895 A1 | 9/2001 |
| GB | 2193359 A | 2/1988 |
| GB | 2228123 A | 8/1990 |
| GB | 9523443.1 | 11/1995 |
| GB | 2307324 A | 5/1997 |
| JP | 01-134565 | 5/1989 |
| JP | 05-073596 | 3/1993 |
| JP | 06-019940 | 1/1994 |
| JP | 06-203238 | 7/1994 |
| JP | 07-234893 | 9/1995 |
| JP | 08-315188 | 11/1996 |
| JP | 09-327991 | 12/1997 |
| JP | 10-049571 | 2/1998 |
| WO | WO 90.09002 | 8/1990 |
| WO | WO 97.18534 | 5/1997 |

OTHER PUBLICATIONS

News Release for King County; dated Feb. 28, 2001; retrieved from www.metrokc.gov/exec/news/2001/022801proc.htm.
News Release for King County; dated Mar. 2, 2001; retrieved from www.metrokc.gov/exec/news/2001/030101ferna.htm.
News Release for King County; dated Feb. 28, 2001; retrieved from www.metrokc.gov/exec/news/2001/0302012.htm.
Office Actions and Notice of Allowance from related U.S. Appl. No. 11/468,284.
Office Actions and Notice of Allowance from related U.S. Appl. No. 10/687,191.
Office Actions from related U.S. Appl. No. 10/687,226.
Office Actions and Notice of Allowance from related U.S. Appl. No. 10/687,243.
Office Actions and Notice of Allowance from related U.S. Appl. No. 10/687,190.
Office Actions and Notice of Allowance from related U.S. Appl. No. 09/617,721.
Office Actions and Notice of Allowance from related U.S. Appl. No. 09/372,405.
Robert Keys, Letter, Jan. 5, 1991, 4 pages.
Robert Keys, Letter, Jan. 30, 1991, 2 pages.

FIG. 7C (continued)

$$\text{Dispense Rate} = \frac{(\text{Forecasted GC} * \text{Percent Capacity} * (1-\text{Distribution Reduction Factor}) * \text{Dispense Time Interval}}{\text{Forecast Time Period}}$$

Dispense Rate = Dispense Rate * (1+No Show Factor)

STOP

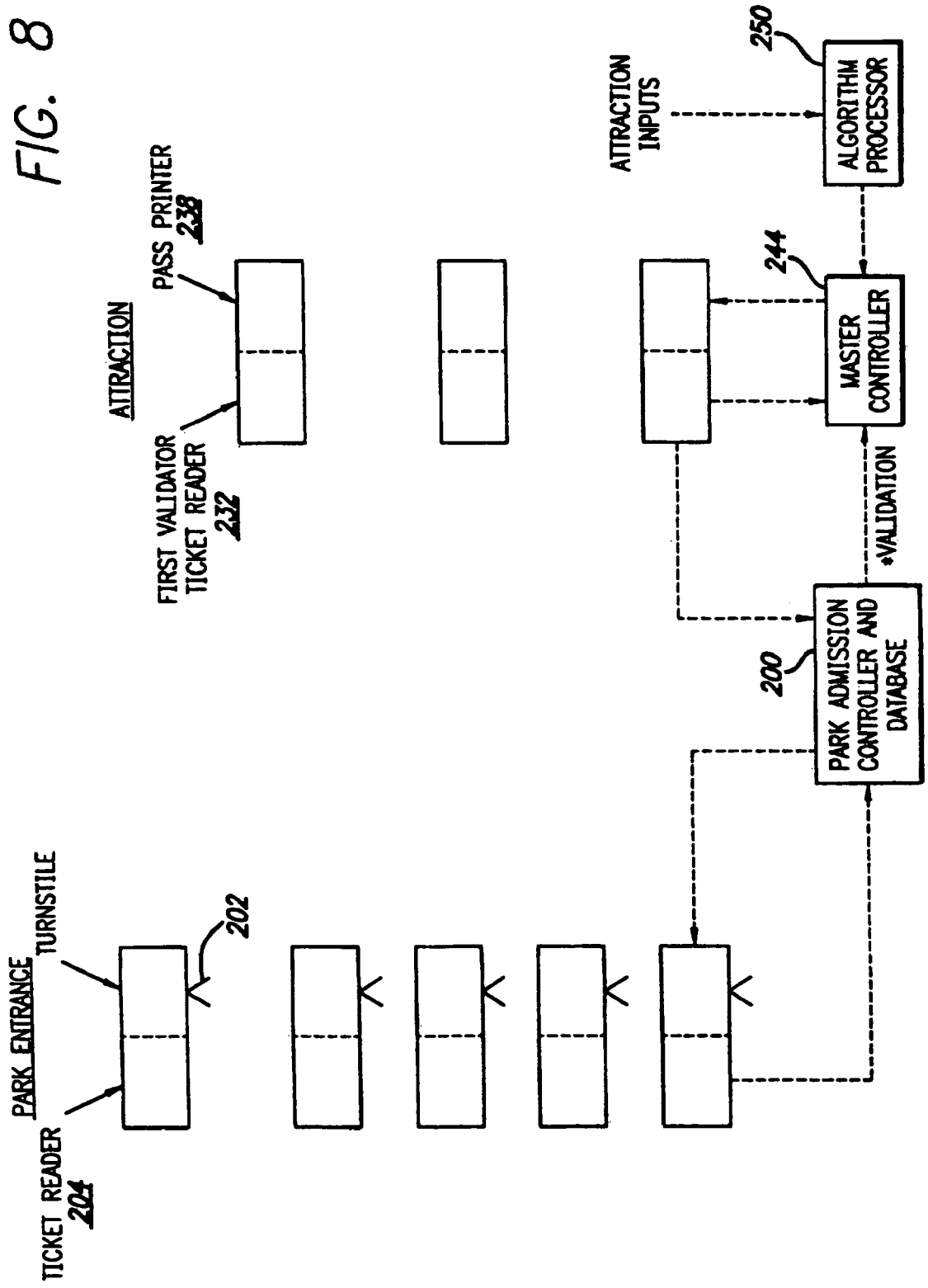

Winnie the Pooh

Enter Any
Time Between

11:15 am
AND
12:15 pm

Another FASTPASS will
be available after
11:15

Peter Pan's Flight

Enter Any
Time Between

1:30 pm
AND
2:30 pm

Another FASTPASS will
be available after
1:30

Buzz Lightyear

Enter Any
Time Between

3:40 pm
AND
4:40 pm

Another FASTPASS will
be available after
3:40

SPACE MOUNTAIN

Enter Any
Time Between

8:10 pm
AND
9:10 pm

Another FASTPASS will
be available after
6:05

Winnie the Pooh

Enter Any
Time Between

11:15 am
AND
12:15 pm

Another FASTPASS will
be available after
9:50

Peter Pan's Flight

Enter Any
Time Between

11:45 pm
AND
12:45 pm

Another FASTPASS will
be available after
11:15

Buzz Lightyear

Enter Any
Time Between

1:50 pm
AND
2:50 pm

Another FASTPASS will
be available after
12:20

SPACE MOUNTAIN

Enter Any
Time Between

3:00 pm
AND
4:00 pm

Another FASTPASS will
be available after
2:45

Winnie the Pooh

Enter Any
Time Between

11:15 am
AND
12:15 pm

Another FASTPASS will
be available after
11:15

BUZZ LIGHTYEAR'S
SPACE RANGER SPIN

Enter Any
Time Between

1:50 pm
AND
2:50 pm

Another FASTPASS will
be available after
1:50

SPACE MOUNTAIN

Enter Any
Time Between

5:25 pm
AND
6:25 pm

Another FASTPASS will
be available after
4:20

09/07/03   c           2:20

Advance FASTPASS

Use this ticket to ride
the following attractions
at the times designated

Winnie The Pooh
            11:15 - 12:15
Buzz Lightyear
             1:50 -  2:50
Space Mountain
             5:25 -  6:25

09/07/03  c

*Option One*
FIG. 14b

Advance FASTPASS

Use this ticket to ride
the following attractions
at the times designated

Buzz Lightyear
            11:15 - 12:15
Space Mountain
            12:55 -  1:55
Winnie the Pooh
             5:15 -  6:15

09/07/03  c

*Option Two*
FIG. 14d

Advance FASTPASS

Use this ticket to ride
the following attractions
at the times designated

Space Mountain
            11:10 - 12:10
Buzz Lightyear
             2:00 -  3:00
Buzz Lightyear
             4:45 -  5:45

09/07/03  c

*Option Three*
FIG. 14f

MANAGEMENT OF THE FLOW OF PERSONS IN ENTERTAINMENT ENVIRONMENTS

RELATED APPLICATIONS

This Application is a continuation in part of U.S. patent application Ser. No. 09/617,721, filed Jul. 17, 2000 now U.S. Pat. No. 6,889,098 entitled METHOD AND APPARATUS FOR MANAGING ATTRACTION ADMISSIONS, which in turn is a continuation in part of application Ser. No. 09/372,405, filed Aug. 10, 1999, and issued as U.S. Pat. No. 6,173,209. This application is also a continuation in part of application Ser. No. 10/687,191 filed Oct. 15, 2003, application Ser. No. 10/687,243 filed Oct. 15, 2003 now U.S. Pat. No. 7,047,205, application Ser. No. 10/687,226 filed Oct. 15, 2003, application Ser. No. 10/687,190 filed Oct. 15, 2003. The contents of those applications are incorporated by reference herein in their entirety.

BACKGROUND

Field of the Disclosure

This disclosure relates to control of crowds. In particular, it concerns the control of the flow of masses of people. More specifically, this is in relation to specific areas, which are centers of concentration for crowds. The methods and systems of the disclosure also concern managing the entry and admission to multiple attractions. In particular, the disclosure is concerned with the management of multiple attractions in entertainment environments such as theme parks.

There are different techniques used to manage lines at theme parks and achieve for patrons of entertainment environments a pleasant experience in minimizing wait times and permitting efficient use of time spent in these parks. Similarly, there is a need for operators of entertainment facilities to improve the throughput of patrons to different ride facilities and establishments in the park. In this way, there is an efficient use of different facilities and patrons can use different facilities and activities in a way, which benefits the park. More patrons can be accommodated on different attractions in an efficient manner.

Overall, the entertainment experience for patrons and operators of entertainment facilities needs to be enhanced.

The disclosure is concerned with a method and system for managing the loading of patrons on different attractions in an entertainment environment where there are multiple attractions. More particularly, the disclosure is concerned with management of lines or queues of patrons in an effective manner which is user-friendly and at the same time provides a system directed towards maximizing use of the facilities in the park by as many patrons as possible.

An improved system, method and apparatus for managing access and loading of attractions in an entertainment environment are thus desired.

Additionally, the disclosure is concerned with an enhanced system and method of crowd control in the sense of moving masses of people in and/or out of areas of people concentration as necessary.

SUMMARY

This disclosure in one form relates to a system and method managing the loading of patrons on multiple attractions in an entertainment environment. It provides for patrons and customers the choice of standing in a first-in first-out line for the attraction, or having a priority space reservation for admission to the attraction at a later time without standing in the first-in first-out line or queue.

There is a provided method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times.

The patron is provided with an additional entry at a time selected by the patron to any one of the multiple attractions in the entertainment environment. This additional entry is affected on a priority basis.

In some cases the patron is permitted to select an essentially immediate access to an attraction qualifying for allocation on a priority basis. In other or cumulative situations the patron additionally is permitted to select one of the available return times for each of multiple different attractions allocated on a priority basis. The additional entry can be obtained by the patron at no additional cost.

In another form there is a provided method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron is permitted access to a first attraction. A request for entry is through application of a request for an allocation of a space on the first attraction. There are the steps of receiving an input from a patron, the input being communicated to a central computer for regulating the load of the first attraction.

The patron with an entry selects at least one of the multiple attractions in the entertainment environment. The entry is affected on a priority basis as selected by the patron.

The entry is selected after receiving of a response by the patron about available return times for the first attraction. The patron is permitted to effect a selection of one of the available return times on a priority basis, whereby the priority basis essentially overrides or supplements the selected return times.

The patron is permitted to an essentially immediate access on a priority basis to one or more qualifying additional or subsequent attractions.

The priority basis is preferably available for a limited time period and selectively for a limited entertainment environment. In another form, the priority basis is available for limited time, and selectively for a limited number of attractions. In another aspect the priority basis is available for a limited number of attractions.

There is a provided method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times, such available return times defining a first time period.

A request for entry of an allocation of a space on a second attraction on a priority basis is possible.

The steps for this include:
i. receiving an input from a patron, the input being communicated to a central computer for regulating the load of the second attraction;
ii. permitting the receiving of a response by the patron about available return times for the second attraction; and
iii. permitting the patron to effect a selection of one of the available return times; such available return times defining a second time period.

The patron is provided with an entry at a second time period selected by the patron to the second attraction in the entertainment environment. The second time period overlaps the first time period.

There is a provided method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times, such available return times defining a first time period.

Application through an entry of a request for an allocation of a space on a second attraction on a priority basis is permitted.

The steps for this include:
i. receiving an input from a patron, the input being communicated to a central computer for regulating the load of the second attraction;
ii. permitting the receiving of a response by the patron about available return times for the second attraction; and
iii. permitting the patron to effect a selection of one of the available return times; such available return times defining a second time period.

The patron is provided with an entry at a second priority time period selected by the patron to the second attraction in the entertainment environment. The second time period is substantially close in time to the first time period. The closeness in time under essentially normal conditions would be too close for use on a first attraction in the first time period and subsequent use on a second attraction in that second time period.

The first priority time period can overlap with the second priority time period for about half of an overall time period as defined collectively by the first time period and the second time period. In another form, the first time period is overlapped by the second time period for about quarter the of an overall time period as defined collectively by the first time period and the second time period.

In yet another form the first time period is adjacent to the second time period by an intervening time period. The intervening time period is about 10% to 30% of the first time period and the second time period.

There can be at least a third time period subsequent to the first and second time periods. There can be at least a third time period subsequent to the first and second time periods.

Where there is at least a third time period subsequent to the first and second time periods, the third time period can be separated from the second time period by an intervening time period.

A method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times.

The patron is provided with an additional entry at a priority time selected by the patron to at least one of multiple attractions in the entertainment environment. The additional entry is affected at available return times selected by the computer for the multiple attractions.

The patron can be permitted to select one of multiple attractions from a menu of available return times for the multiple attractions.

The patron additionally can be permitted to select a limited number of attractions, selectively only one attraction, from one of the available return times for each of multiple different attractions.

The patron can be automatically provided with times for one of multiple attractions from a menu of available return times for the multiple attractions.

A method of managing the loading by patrons of multiple attractions in an entertainment environment wherein different patrons are permitted access to the attraction on at least two bases, firstly, a first-in first-out basis, and secondly, on a priority basis established by a prior allocation of a space to the attraction.

A patron of an attraction is permitted priority access to multiple attractions. Entry is permitted through application of a request for an allocation of a space on the multiple attractions.

The steps for this include:
i. receiving an input from a patron, the input being communicated to a central computer for regulating the load of the multiple attractions;

ii. permitting the receiving of a response by the patron about available return times for the multiple attractions; and iii. permitting the patron to effect a selection of the available return times for the multiple attractions.

The patron entry can be at a selected priority return times to the multiple attractions in the entertainment environment. The multiple schedules of return times of developed by the computer for the multiple attractions. The patron can be provided with one of the multiple schedules of return times and the patron can be provided entry according to the selected schedule.

The disclosure further provides for an improvement whereby a control computer and software system dynamically and constantly adjusts to account for variations in the entertainment environment, the patron load, external factors such as weather, breakdown or slowing down of certain attractions in the entertainment complex, and over demands for special promotions and attractions.

The disclosure includes a method and system of managing the loading by patrons of multiple attractions in an entertainment environment. Different patrons are permitted access to the attraction on at least two bases, firstly, on a first-in first-out basis, and secondly, on a priority basis established by a prior allocation of a space to the attraction.

The method and system further permits a patron of an attraction to use a wireless device in order to gain access to an attraction. The wireless device may for example, be a mobile telephone. Entry of a request on the wireless device is made for an allocation of a space on the first attraction.

In another aspect of the present disclosure there is a hierarchy for patrons using the priority basis. Different patrons in the hierarchy are permitted access to a first attraction.

The access can be redeemable through a selected essentially automatic procedure. Such procedure can include any one or more of the reading of one of an RF identification, reading of a magnetic code or barcode allocated to the patron. Redemption can be at a time of entry into the environment or at the attraction in the environment.

A computing process determines the mix ratio of numbers of accesses granted to the priority access and non-priority access. Redemptions of the priority accesses are fed back such that near real time updates of availability for further granting of accesses may be computed.

A goal of this disclosure is to improve the desired functionality needed to derive increased guest satisfaction, additional revenue opportunities and resort differentiation.

The disclosure is further described in relation to the "Fastpass" (Trademark, Disney Enterprises, Inc.) system of achieving line management. For ease of reference the trademark Fastpass is used herein. It is however not the only system of line or queue management covered by this disclosure. The disclosure generally covers different priority systems operable conjunctively with the first-in first-out system.

The disclosure also concerns different aspects of crowd control in many different environments and circumstances as more generally described below.

Furthered objects, features and advantages of the present disclosure will become apparent from the detailed description and drawings, which follow, when considered with the attached figures.

DRAWINGS

FIG. 7a to 7c show a flow diagram illustrating a method of the disclosure by which information is fed from a controller to a master server of an embodiment of the disclosure.

FIG. 8 illustrates a system in accordance with another embodiment of the disclosure.

FIGS. 12a, 12c, 12e and 12g illustrate a prior art Fastpass system whereby Fastpass entry cards are issued for sequential times to different attractions in an entertainment center.

FIGS. 12b, 12d, 12f and 12h illustrate a Fastpass system whereby Fastpass entry cards are issued for concurrent times to different attractions in an entertainment center.

FIGS. 14a, 14c, and 14e are illustrations of a prior art system whereby several Fastpass cards are issued for different attractions at an entertainment center.

FIGS. 14b, 14d, and 14f are illustrations of three different options of a system whereby a Fastpass card is issued in advance for different attractions at an entertainment center.

DESCRIPTION

In the following description, numerous specific details are set forth in order to provide a more thorough description of the present disclosure. It will be apparent, however, to one skilled in the art, that the present disclosure may be practiced without these specific details. In some instances, well-known features may have not been described in detail so as not to obscure the disclosure.

There is at least a method and a system for managing admission to an attraction. The system is particularly applicable for use in an environment where the number of customers which desire access to an attraction is greater, at one or more times, than the capacity of the attraction. Such a condition may be referred to as a condition of insufficient capacity. By insufficient capacity, it is meant that fewer customers can be accommodated at/by the attraction than wish to be accommodated at a particular time or over a period of time. This condition may arise by an imposed limitation, such as where it is desired to limit the number of persons in a particular area at a given time. This may be for safety or a variety of other purposes. This condition may also arise due to physical limitations, such as the number of seats on a particular ride and the cycle time of the ride.

Figure 1:
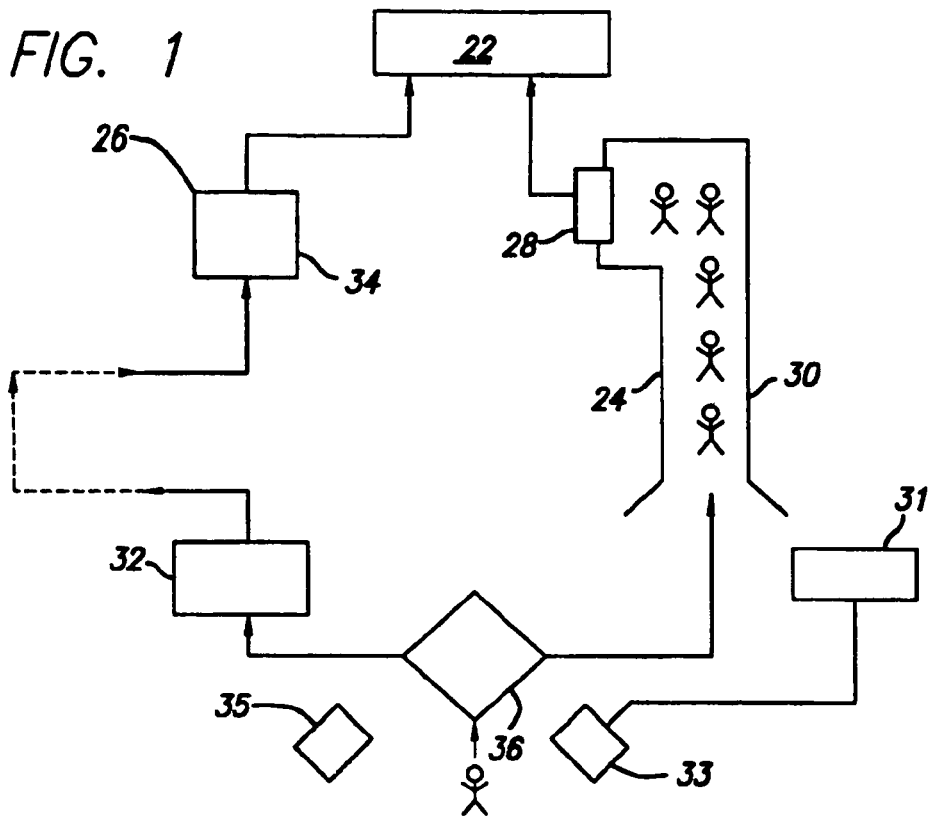
FIG. 1 is a schematic overview of an attraction admission management system in accordance with an embodiment of the disclosure for managing admission to a single attraction.

FIG. 1 is an illustration of one embodiment of the present disclosure. The system is for use in controlling admission or entry to an attraction 22. As used herein, the term "attraction" is meant to comprise any location or presentation to which one or more customers wish to gain access. The attraction may comprise a location at which a service is provided, such as a ride, stage or other show, theater, parade, restaurant or other food service, merchandise location, transportation or the like. The attraction may also comprise a geographic location, such as a natural wonder, art museum or the like. Thus, while the system has particular applicability to and is described herein for use in controlling access to a ride-type attraction, the system may be used in a wide variety of other environments where it is desired to avoid lines.

The system includes a first queue 24 by which customers gain access to the attraction 22 by waiting in a line, much as has been done in the prior art. In other words, the customers in the first queue 24 have an order in line based on a time at which they enter the queue, and are able to utilize the attraction in that order when a space or capability is available. In one or more embodiments, the queue 24 includes a turnstile 28, or similar device for controlling access, positioned at an entrance of the attraction 22. The queue 24 may also include ropes, fences 30 or the like for defining a space in which the customers line up.

The customers in the first queue 24 are permitted to access the attraction when there is an open spot not filled by the customers accessing the attraction via the second queue 26. As described in more detail below, the number of customers permitted to access the attraction via the second queue 26 may be adjusted to provide a certain number of open spots for customers in the first queue 24. For example, 80% of the available spots for the attraction may be dedicated to and filled by customers from the second queue 26, while the remaining 20% are filled by customers from the first queue 24. In addition, if one or more of the spots dedicated to the customers of the second queue 26 are not filled, such as if one or more customers who obtain passes for accessing the second queue 26 do not return to access the attraction, then these spots may be filled by customers in the first queue 24. As described in more detail below, this arrangement permits the attraction to operate at all times at optimum capacity.

The system of the disclosure also includes the second queue 26 by which customers gain access to the attraction 22 without waiting in a line and thereby avoid the first queue 24. In one or more embodiments of the system, the system includes at least one validator for validating the right of a customer to receive an assigned time to access the attraction via the second queue.

In the embodiment illustrated in FIG. 1, the system includes a first validator 32 validating the right of a customer to receive an assigned future time to utilize the second queue 26, and a second validator 34 for permitting the customer to access the attraction 22 at a future time via the second queue 26. In this manner, the customer can avoid the first queue 24.

In operation, a customer utilizes the first validator 32 to obtain an assigned time in the future for accessing the attraction via the second queue 26. As described below, in one embodiment, an entitled or "validated" customer may be issued a pass, which includes a time or time range at which the customer is entitled to return and utilize the attraction. The amount of time between the time a pass is issued and the time at which the customer can utilize the attraction depends on a number of factors, including the number of people who have already obtained passes, the capacity of the attraction, the operating speed of the attraction, staffing availability, the capacity of the attraction allocated to the customers accessing it via the second queue, and any delays related to operation of the attraction.

When the assigned time or time range (such as that indicated on the pass) occurs, the customer is entitled to access the attraction without waiting in line. The customer accesses the second queue 26 and establishes entitlement to access the attraction via the second queue 26. In one embodiment, the customer presents the issued pass at second validator 34 and if the pass is valid, i.e., the time or time range is appropriate, the pass is not counterfeit, etc., the customer is admitted to the attraction.

A customer may only use the second queue when the customer has not previously been issued a yet unused or unexpired pass. This scheme is to prevent customers from obtaining multiple passes for a single attraction, preventing others from enjoying it, or to prevent customers from reserving admittance to multiple attractions. A customer may be permitted to obtain multiple passes to one or more attractions, as described in greater detail below.

As illustrated in FIG. 1, at or near an entrance to attraction 22, a customer is presented with a point of decision 36 where the customer decides whether to access the attraction 22 via the first queue 24 or the second queue 26. When there is no appreciable line in the first queue 24, the customer may decide to forego the second queue and utilize the attraction in a prior art manner. If the line or queue 24 is too long, or if the customer wishes to utilize the system of the disclosure, the customer chooses the second queue 26.

The system includes a first queue wait time generator 31 and associated display 33. The first queue wait time generator 31 is configured to generate a time regarding the wait associated with accessing the attraction via the first queue 24 by a customer about to enter the first queue 24. Of course, the wait time may be calculated manually, such as by tracking the wait time of one or more particular customers through the first queue 24 from time of entry until time of attraction access. In one or more embodiments, the first queue wait time generator 31 includes sensors which provide data for use by the generator 31 in determining a current length of the wait associated with that line. The sensors may provide information such as the physical length of the line. The generator 31 may use this information and information such as the current ride capacity, percentage of capacity allocated to customers accessing via the second queue 26, and other factors for generating an approximate first queue wait time. Various data for use by the generator 31 may be input manually as well. For example, a ride operator may visually estimate the physical length of a line and input line length data to the generator 31. The first queue wait time display 33 is configured to provide a customer at the point of decision 36 with the first queue wait time information. The display 33 may comprise a digital or other display for displaying hours and/or minutes of wait time.

The system includes a second queue time display 35. This display 35 is configured to display the next time, which will be assigned to a customer for accessing the attraction through the second queue 26. The display 35 may comprise a digital or other display displaying hours and/or minutes of wait time.

Using the information regarding the access times available to a customer via the displays 33 and 35 respectively, a customer is aided in the process of deciding to access the attraction through the first or second queues 24 and 26 respectively.

The first validator 32 for verifying entitlement of a customer to an assigned future time may be located remote from the attraction or there may be more than one first validator 32, one located near the attraction and one or more located remote therefrom. For example, a first validator 32 may be located near an entrance to a theme park. In such an event, a display 33 for displaying first queue waiting time and a display 35 for displaying the next available time for accessing the attraction via the second queue 26 may be located at the remote first validator 32 as well.

Figure 2:
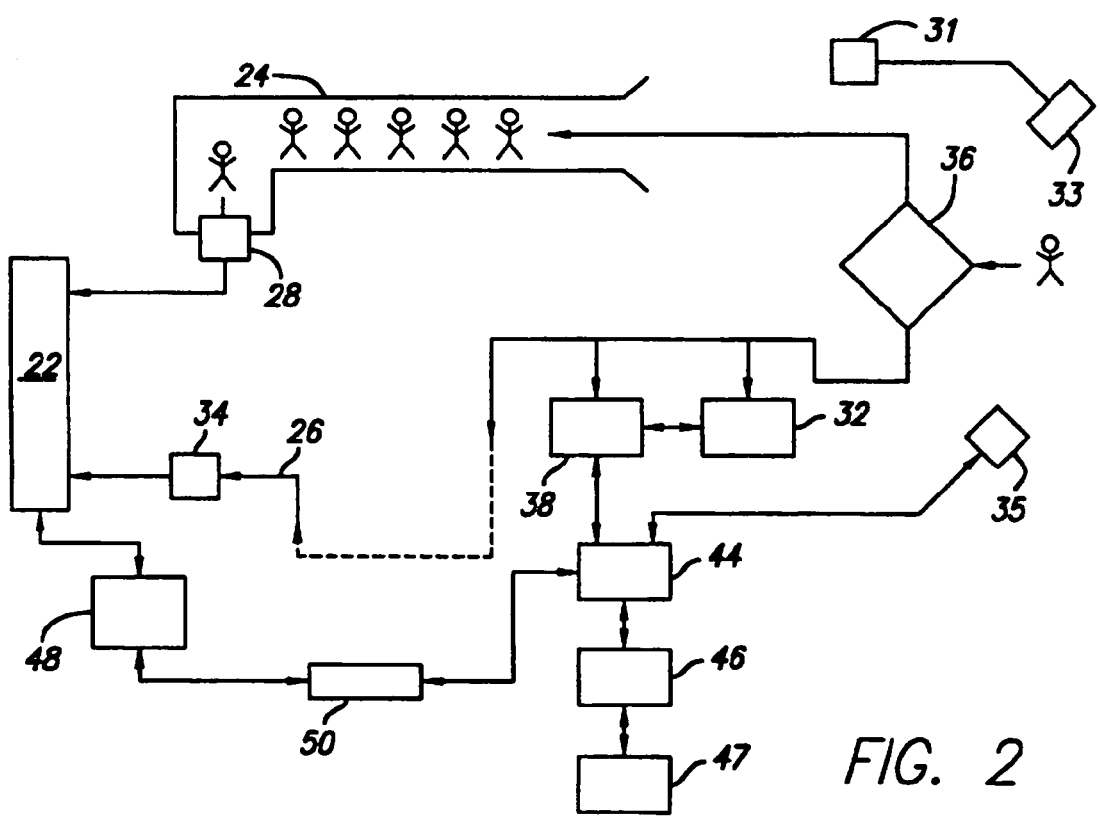
FIG. 2 illustrates in more detail a system such as that illustrated in FIG. 1.

FIG. 2 illustrates one embodiment of a system having a first validator 32, a media distributor 38, and a second queue 26 having an associated second validator 34. The first validator 32 is arranged to determine or verify that a customer is entitled to an assigned future time for accessing the attraction via the second queue 26. In one embodiment, the first validator 32 establishes the right of a customer to a pass having an assigned future time, the pass for use by the customer in gaining access to the attraction 22 via the second queue 26 at the future time. The first validator 32 may comprise a card-reader type device, which is arranged to read a magnetic stripe on a ticket issued to the customer. In such an arrangement, each customer may be provided with a ticket or similar element, which establishes a customer's right to access the attraction 22.

In an embodiment where the attraction 22 is inside of or part of a theme park, the ticket customer uses for validation may be a ticket, which is issued to the customer by which the customer gains access to the park itself. In such an arrangement, the first validator 32 may be arranged to communicate with a main database containing information regarding the customer(s), such as by ticket numbers, which are entitled to utilize the second queue 26.

The first validator 32 may be arranged to read input from a keypad, information on a card, to accept issued tokens, identify one or more biometric identifiers of a customer such as a radio-frequency identification (RFID); retina, voice, thermal, finger or hand geometry signature; or a visual identification of the customer or the like.

If the first validator 32 establishes the right of the customer to an assigned time in the future for accessing the attraction via the second queue 26, then the media distributor 38 distributes a pass to a customer which the customer may utilize to access the attraction via the second queue 26. In one embodiment, the media distributor 38 comprises a printer, which prints a paper pass or similar element. The media distributor 38 may issue one or more of a wide variety of media as passes, such as magnetic-stripe encoded or "smart" cards, punch-type cards, coded tokens, barcode, infrared signal, or biometric identifiers such as those set forth above and the like.

The pass, which is distributed to each customer by the media distributor 38, is arranged to permit the customer to gain access to the attraction 22 at a time in the future. The particular time, as described below, may vary upon a wide variety of circumstances. The time comprises an assigned access time or time range, which is printed on the pass, which is issued to an entitled customer. In the examples below, the pass is referred to as having a "time" associated with it. It will be understood that this contemplates both a specific time and/or a time range, time period, or time window.

The first validator 32 and the media distributor 38 may be located adjacent to the attraction and/or remote therefrom. In the event the first validator 32 and media distributor 38 are located near the attraction, after obtaining a pass or the like, the customer may leave the area of the attraction 22 and need not return to the attraction 22 until the time provided on the pass. In the event the customer obtains a pass from a remote media distributor 38, the customer simply continues about their activities until it is necessary to travel to the vicinity of the attraction at the assigned time. As described in more detail below, the right of a customer to obtain passes may be a value added feature for which the customer pays additional monies, such as at the same time as purchasing a main ticket.

The first validator 32 may be integral with a main ticket issuer/validator and second queue access passes may be issued at the same time or as part of a main ticket. For example, a customer entering a theme park may be permitted, at the time they present or purchase their ticket, to obtain one or more passes providing future times assigned by the system. This permits a customer to plan or schedule their day ahead of time. In this arrangement, the ticket which the customer uses to access the theme park may be encoded and/or printed with access time information for permitting the customer to access one or more attractions at future times, avoiding the need to issue separate passes.

The system and method for permitting access to the attraction 22 includes a second validator 34 for establishing the right of a customer to access the attraction via the second queue 26 at assigned time. In one embodiment, the second validator 34 validates the media or pass issued by the media distributor 38 and held by a customer. In one or more embodiments, the second validator 34 comprises a human attendant, which reads information printed on the pass and verifies the information. The attendant may verify the printed assigned time or time range against the current time, a date of the pass against a current date, and the attraction for which the pass is issued.

Alternatively, the second validator 34 may comprise a card reader or other device for confirming the entitlement of a customer to access the attraction 22 via the second queue 26. For example, the second validator 34 may be arranged to verify data associated with the element issued by the media distributor 38, such as a barcode or infrared signal.

The pass issued to a customer may be issued only for reference by the customer for knowing and remembering the assigned time or range of time, and the second validator 34 may be configured to verify entitlement of the customer in a manner independent of the pass. For example, a customer may establish entitlement to a pass with a fingerprint, RFID, bar code or other personal biometric data, at the first validator 32. The pass provides written indication of the assigned time to the customer. When the customer accesses the second queue 26, the customer may be required to establish validation at the second validator 34 with a fingerprint, RFID, bar code or other personal biometric data, again. In this arrangement, the second validator 34 determines that the customer is entitled to access the attraction by establishing that the identify of the customer with the fingerprint and determining if the time the customer is accessing the second queue 26 is at the time/in the range of time which was assigned to the customer. It may be appreciated that the second validator 34 may be configured to establish validation in one or more of the variety of manners described above with respect to the first validator 32. It should be appreciated that customers may not be issued passes at all.

One or more schemes are provided for determining the access time, which is associated with each media, which is issued by the media distributor 38. A time at which a customer is permitted to gain access to the attraction 22 via the second queue 26 is dependent upon one or more of a variety of factors, including, but not limited to, the following: the capacity of the attraction, the capacity of the attraction which is allocated to customers accessing through the second queue 26, the total number of customers who may wish to access the attraction 22, the current and future staffing of the attraction, the demographics of the customers, the time of day and the day of the week.

The system includes a controller 44. As illustrated, the controller 44 is arranged to control the media distributor 38. The controller 44 may also be arranged to control other aspects of the system, such as the first validator 32. In one or more embodiments, the controller 44 receives attraction capacity and/or time information and instructs the media distributor 38 what time to issue in association with each pass. The controller 44 may send a signal to the second queue time display 35 for displaying the next time to be assigned.

A keypad 46 or other data entry/control device, such as a keyboard, mouse, joystick or the like, may be provided for manually entering data and controlling the controller 44. The keypad 46 may be used to enter specific time information, reset the controller and the like. A display screen 47 such as a CRT may be associated with the controller 44 and keypad 46 for permitting a user to view information regarding the system.

A local server 48 is arranged to send and receive data. The local server 48 is arranged to receive data about the capacity and other characteristics of the attraction 22. For example, various sensors may be associated with the attraction 22 for providing data. In one or more embodiments, the sensors not shown may monitor ride speed, the number of customers passing through or standing in the first queue 24, the capacity of the ride, etc. The local server 48 may receive data from these sensors at various times or continuously, or may transmit specific requests for data. In other embodiments, the local server 48 may be a remote server in communication with the attraction and sensors.

Information may be inputted manually or automatically. For example, each staff member currently available to operate a ride may manually enter their employee code to indicate to the system that they are available to operate the system. Based on the number of employees, which are indicated as available, adjustments may be made to the number of customers, which are likely to be serviced during a period of time.

As will be appreciated by those of skill in the art, many current attractions, such as thrill rides, already include sophisticated ride control systems. These systems have a variety of sensors and controls for monitoring and controlling the ride. The local server 48 may simply comprise an interface with the individual ride control systems for receiving information therefrom.

The information provided to the server 48 is transmitted to an algorithm processor 50. The algorithm processor 50 utilizes the data to determine times for issuance by the media distributor 38. In general, it is desired that the algorithm processor 50 issue a time associated with each media which permits the customer to return to the attraction 22 at the predetermined time at the second media validator 34 and access the attraction 22 such as via second validator 34 without standing in a line. In order to accurately balance demand and capacity, the algorithm processor 50 obtains information regarding a variety of factors, which affect demand and capacity. Although shown as separate entities in FIG. 2, the controller 44 and algorithm processor 50 may be implemented as a single device or process.

If the wait associated with the first queue 24 becomes longer than a desirable time, then the algorithm processor 50 may be arranged to issue fewer numbers of access times or access times which are later in time so as to permit a greater number of customers from the first queue 24 to access the attraction 22 for a period of time. In the event the capacity of the attraction 22 suddenly decreases, the algorithm processor 50 may be arranged to respond in a similar fashion. In the event the capacity of the attraction 22 increases, then the algorithm processor 50 may be arranged to issue a greater number of access times.

Figure 3:
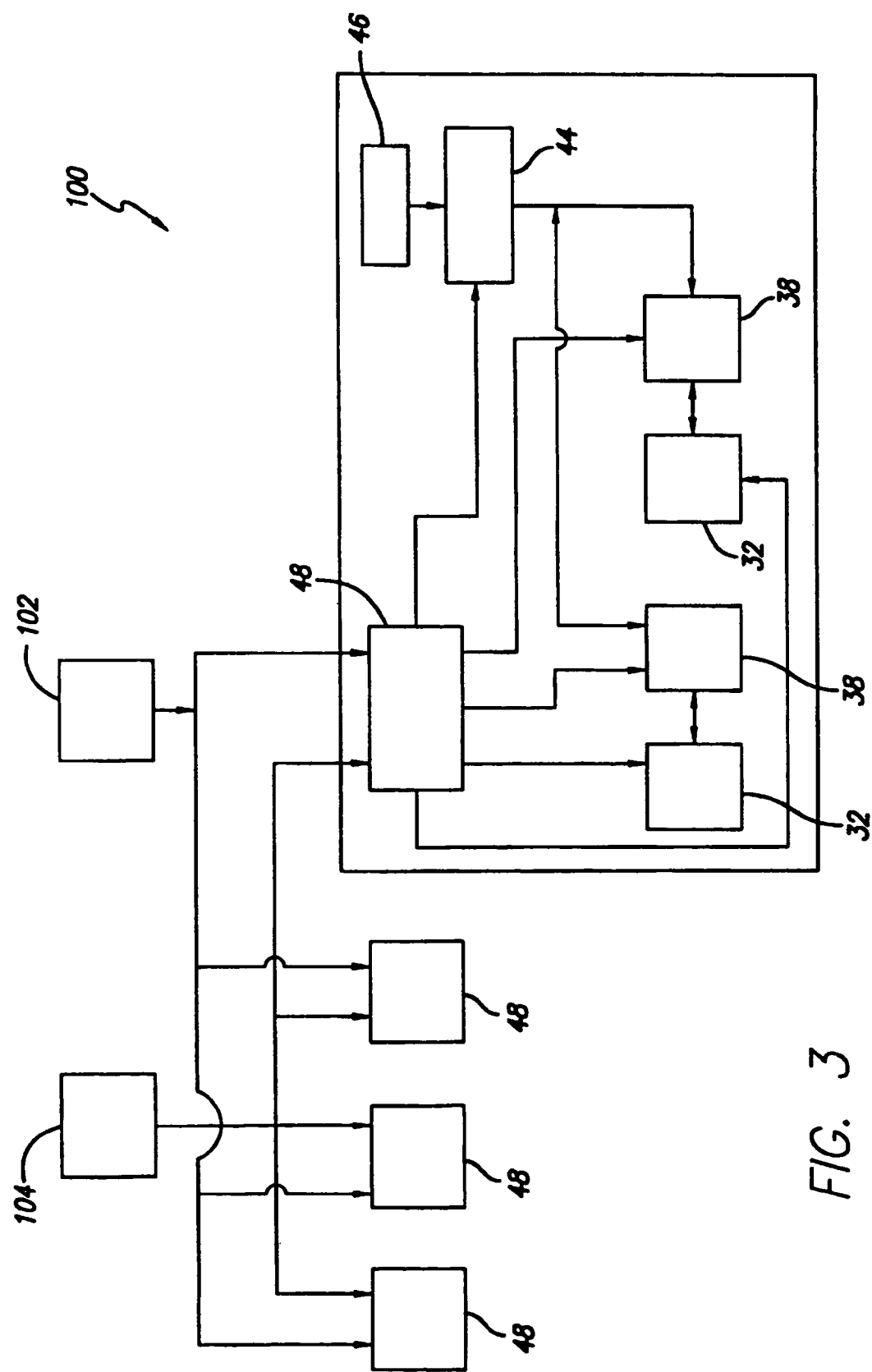
FIG. 3 illustrates a system of the present disclosure, which includes multiple systems for managing admission to multiple attractions.

As illustrated in FIG. 3, more than one media distributor 38 and first validator 40 may be provided at each attraction 22. More than one second media validator may be provided for permitting access to the attraction 22.

A computing process determines the mix ratio of numbers of accesses granted to the priority access and non-priority access. Redemptions of the priority accesses are fed back to the computer system such that near real time updates of availability for further granting of accesses may be computed.

There is also the ability to permit at least one of the exchange or return of previously assigned priority accesses. Such exchange permits for updating the computation of a load of the attraction. A non-use of a priority assignment is factored into a computation of loading.

Immediate Freebie Fastpass

In some systems the guest receives one ticket that can be used one time at an attraction of the choice for boarding with limited or no wait.

Figure 11:
FIG. 11 is an illustration of a Fastpass card for use in the immediate freebie pass system.

In FIG. 11 there is illustrated a method and system of managing the loading by patrons of multiple attractions in an entertainment environment. Different patrons are permitted access to the attraction on at least two bases, firstly, a first-in first-out basis, and secondly, on a priority basis established by a prior allocation of a space to the attraction. When using the priority basis system it is possible to receive a freebie Fastpass system for immediate use of another attraction in the entertainment area.

A patron of an attraction of the priority system is permitted access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times.

The patron is provided with an additional entry on a priority basis at a time selected by the patron to any one of the multiple attractions in the entertainment environment. The additional entry is affected on a priority basis.

In some cases the patron is permitted to select an essentially immediate access to an attraction qualifying for allocation on a priority basis. In other or cumulative situations the patron additionally is permitted to select one of the available return times for each of multiple different attractions allocated on a priority basis. The additional entry can be obtained by the patron at no additional cost.

A shown in FIG. 11 there is a Fastpass which indicates that it is good for immediate entry to a Fastpass attraction at the Magic Kingdom.

Front of the Line Fastpass

In some systems there is the facility for providing the guest with a front of the line privilege. This would enable the case to wait five minutes or less will be guaranteed a place in a subsequent show for all attractions or for Fastpass attractions only. The attraction right times can be chosen by the guest. The guest can use the privilege only once per attraction or show. The guest with use the Fastpass queue for attractions with a Fastpass return line. A special designated queue is used for other attractions or shows that do not have Fastpass.

The Fastpass method and system effects the loading by patrons of multiple attractions in an entertainment environment and are permitted access to the attraction on at least two bases, firstly, a first-in first-out basis, and secondly, on a priority basis established by a prior allocation of a space to the attraction.

A patron is permitted access to a first attraction. A request for entry is through application of a request for an allocation of a space on the first attraction. There are the steps of receiving an input from a patron, the input being communicated to a central computer for regulating the load of the first attraction.

The entry is selected after receiving of a response by the patron about available return times for the first attraction. The patron is permitted to effect a selection of one of the available return times, whereby the priority basis essentially overrides or supplements the selected return times.

The patron with an entry selects additionally at least one of the multiple attractions in the entertainment environment. The entry is affected on a priority basis as selected by the patron.

The priority basis is preferably available for a limited time period and selectively for a limited entertainment environment. In another form, the priority basis is available for limited time, and selectively for a limited number of attractions. In another aspect the priority basis is available for a limited number of attractions.

The patron is permitted to an essentially immediate access on a priority basis to one or more qualifying attractions subsequent or additional to the one for which a Fastpass has been obtained. If this is not an entertainment feature normally available for a priority, a special procedure is made available for the patron to use the attraction a priority basis.

Concurrent Fastpass

In some systems the guest is able to hold to more Fastpass tickets a time for the entire day.

FIGS. 12a, 12c, 12e and 12g illustrate a prior art Fastpass system whereby Fastpass entry cards are issued for sequential times to different attractions in an entertainment center. There is no overlap in the times between the different attractions to be used on a priority basis. Indeed there is a time space between the end of a prior attraction in a serried and the beginning of another.

Contrarily in FIGS. 12b, 12d, 12f and 12h there is illustrates a Fastpass system whereby Fastpass entry cards are issued for concurrent times to different attractions in an entertainment center.

Different patrons are permitted access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times, such available return times defining a first time period.

A request for entry of an allocation of a space on a priority basis on a second attraction is possible.

The steps for this include:
i. receiving an input from a patron, the input being communicated to a central computer for regulating the load of the second attraction;
ii. permitting the receiving of a response by the patron about available return times for the second attraction; and
iii. permitting the patron to effect a selection of one of the available return times; such available return times defining a second time period.

The patron is provided with an entry at a second priority time period selected by the patron to the second attraction in the entertainment environment. The second time period overlaps the first time period.

In a different form of concurrent Fastpass a patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times, such available return times defining a first time period.

Application through an entry of a request for an allocation of a space on a second attraction is permitted.

The steps for this include:
i. receiving an input from a patron, the input being communicated to a central computer for regulating the load of the second attraction;
ii. permitting the receiving of a response by the patron about available return times for the second attraction; and
iii. permitting the patron to effect a selection of one of the available return times; such available return times defining a second time period.

The patron is provided with an entry at a second priority time period selected by the patron to the second attraction in the entertainment environment. The second time period is substantially close in time to the first time period. The closeness in time under essentially normal conditions would be too close for use on a first attraction in the first time period and subsequent use on a second attraction in that second time period.

The first time period can overlap with the second time period for about half of an overall time period as defined collectively by the first time period and the second time period. In another form, the first time period is overlapped by the second time period for about quarter the of an overall time period as defined collectively by the first time period and the second time period.

In yet another form the first time period is adjacent to the second time period by an intervening time period. The intervening time period is about 10% to 30% of the first time period and the second time period.

There can be at least a third time period subsequent to the first and second time periods. There can be at least a third time period subsequent to the first and second time periods.

Where there is at least a third time period subsequent to the first and second time periods, the third time period can be separated from the second time period by an intervening time period.

A shown in FIGS. 12a, 12c, 12e and 12g the different Fastpass configurations prior art all have a space of time between each of the tickets. The space of time can be 15 minutes or more.

A shown in FIGS. 12b, 12d, 12f and 12h the concurrent Fastpass is available the different tickets for the different Fastpass attractions overlap in time by acceptable amount of time or are sufficiently close in time which would otherwise not be acceptable time gap. For instance FIGS. 12f and 12h have a time gap of 10 minutes which is normally too short time between the two attractions as indicated by FIGS. 12f and 12h.

Surprise Fastpass

In some systems when a guess visits an existing Fastpass distribution machine at each attraction they receive a Fastpass for that attraction and an attached Fastpass that has three other attractions with return times on which they can pick a single time.

Figure 13A:
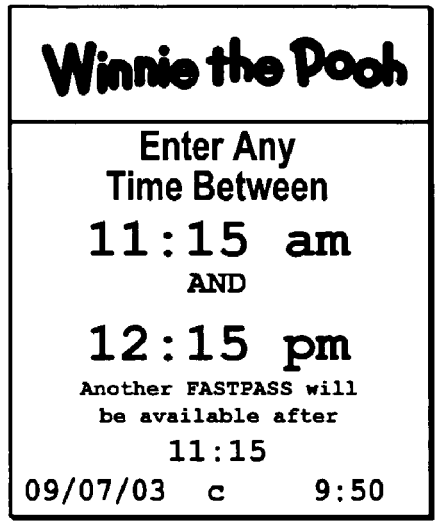
FIG. 13a illustrates a prior art Fastpass card for a first attraction, and indicating that another Fastpass card will be available after a specified time.
Figure 13B:
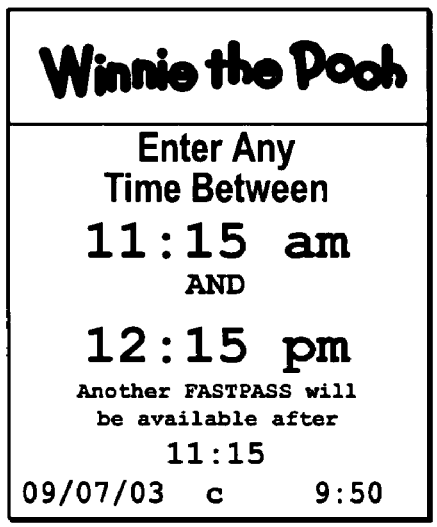
FIGS. 13b and 13c illustrates a Fastpass card for a first attraction, and a second Fastpass card for one of another attraction at a specified later time, which is issued as a surprise to the holder of the first Fastpass card.
Figure 13C:
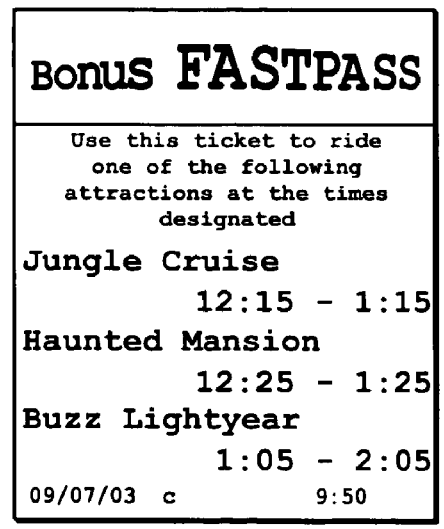

FIG. 13a illustrates a prior art Fastpass card for a first attraction, and indicating that another Fastpass card will be available after a specified time. FIGS. 13b and 13c illustrates a Fastpass card for a first attraction, and a second Fastpass card for one of another attraction at a specified later time, which is issued as a surprise to the holder of the first Fastpass card. Access to the attraction on at least two bases, firstly, a first-in first-out basis, and secondly, on a priority basis established by a prior allocation of a space to the attraction.

A patron of an attraction is permitted priority access to a first attraction. Entry is permitted through application of a request for an allocation of a space on the first attraction.

The steps for this include:
i. receiving an input from a patron, the input being communicated to a central computer for regulating the load of the first attraction;
ii. permitting the receiving of a response by the patron about available return times for the first attraction; and
iii. permitting the patron to effect a selection of one of the available return times.

The patron is provided with an additional entry at a time selected by the patron to at least one of multiple attractions in the entertainment environment. The additional entry is effected at available return times selected by the computer for the multiple attractions.

The patron can be permitted to select one of multiple attractions from a menu of available return times for the multiple attractions.

The patron additionally can be permitted to select a limited number of attractions, selectively only one attraction, from one of the available return times for each of multiple different attractions.

The patron can be automatically provided with times for one of multiple attractions from a menu of available return times for the multiple attractions.

A shown in FIG. 13a there is only a single Fastpass this is issued in accordance with the prior art systems. As illustrated in FIGS. 13b and 13c there is a Fastpass system where a single Fastpass is issued and additionally a bonus Fastpass is issued giving the guest the choice of one of three other attractions on a priority basis.

Advanced Fastpass

In some systems there is the ability for a guest to be able to select a number of specific attractions, possibly 3 to 5, and the entertainment center assigns times for each of them and provides the Fastpass tickets to the guest prior to the riding of the first attraction.

FIGS. 14a, 14c, and 14e are illustrations of a prior art system whereby several Fastpass cards are issued for different attractions at an entertainment center. FIGS. 14b, 14d, and 14f are illustrations of three different options of a system whereby a Fastpass card is issued in advance for different attractions at an entertainment center.

Access to an attraction is at least on at least two bases, firstly, a first-in first-out basis, and secondly, on a priority basis established by a prior allocation of a space to the attraction.

A patron of an attraction is permitted priority access to multiple attractions. Entry is permitted through application of a request for an allocation of a space on the multiple attractions.

The steps for this include:
i. receiving an input from a patron, the input being communicated to a central computer for regulating the load of the multiple attractions;
ii. permitting the receiving of a response by the patron about available return times for the multiple attractions; and
iii. permitting the patron to effect a selection of the available return times for the multiple attractions.

The patron entry can be at a selected return times to the multiple attractions in the entertainment environment. The multiple schedules of return times of developed by the computer for the multiple attractions. The patron can be provided with one of the multiple schedules of return times and the patron can be provided entry according to the selected schedule.

Figure 6:
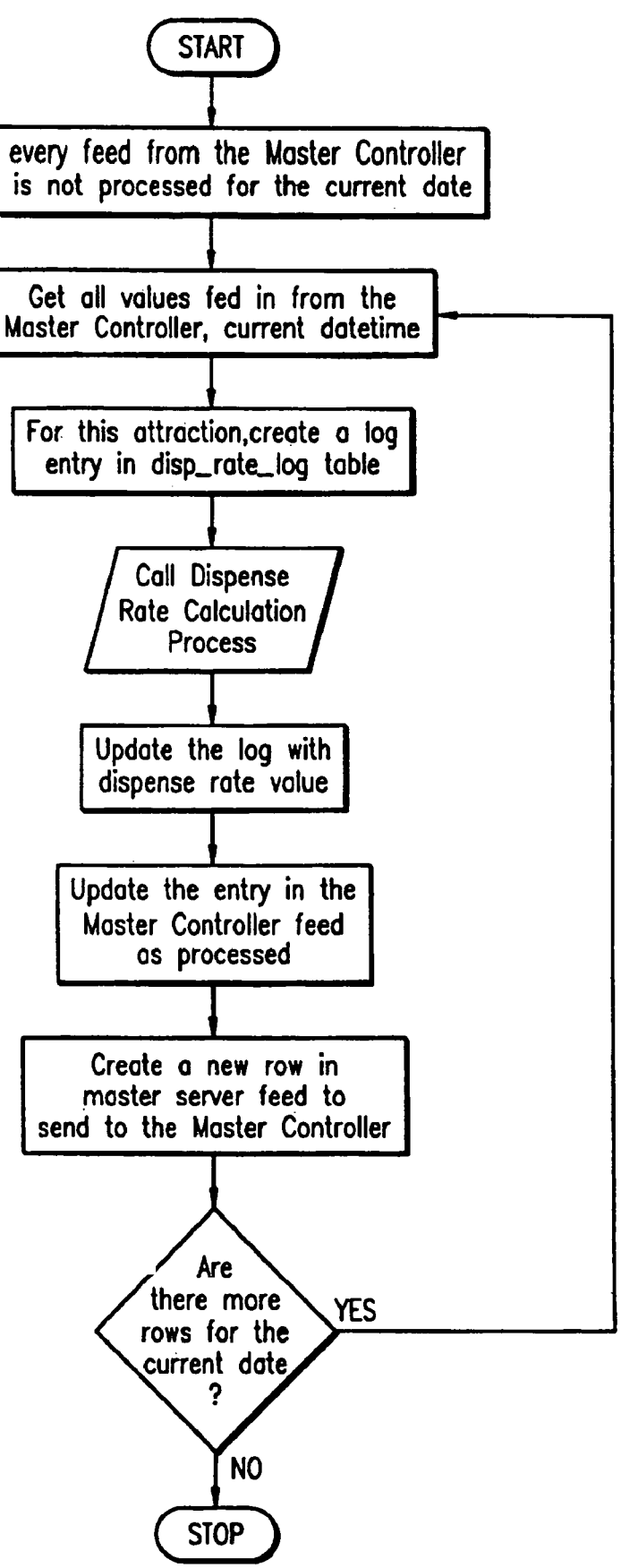
FIG. 6 is a flow diagram illustrating an embodiment of the disclosure where information is fed from a master server to a controller of an embodiment of the disclosure.
Figure 7A:
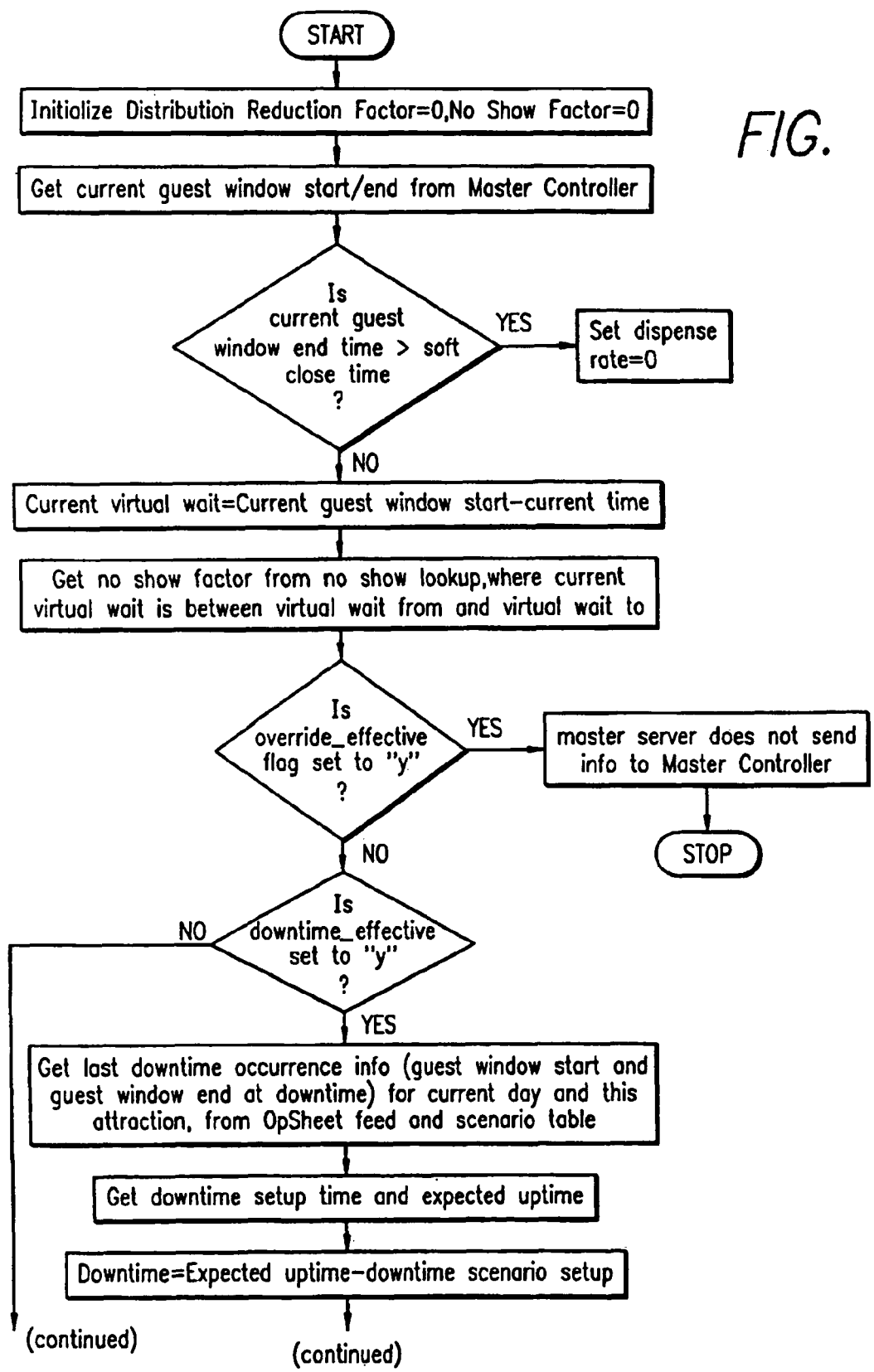
Figure 7B:
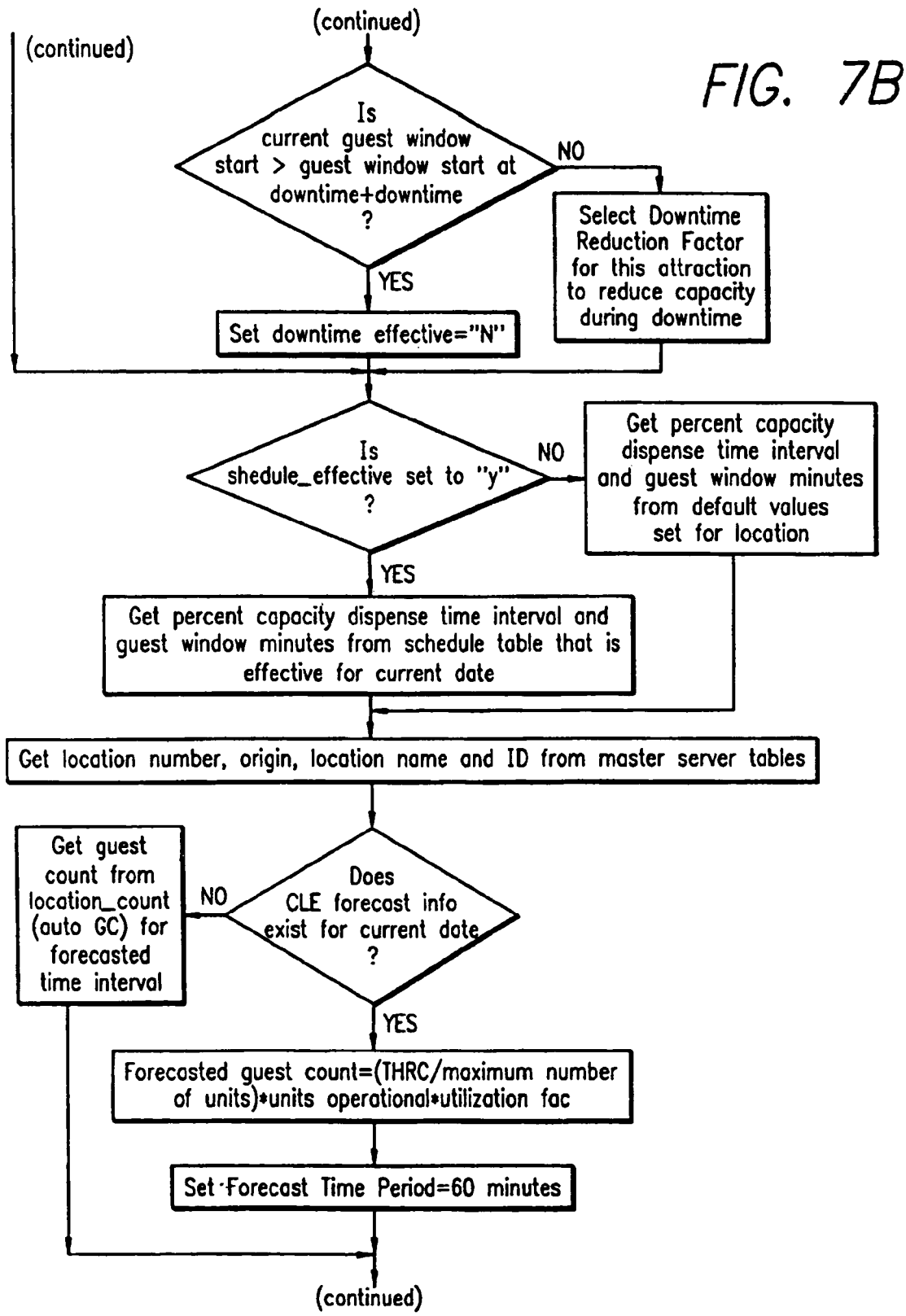

FIG. 6 is a flow diagram illustrating a protocol by which the master server 102, referred to in the figure as the "Master Server Feed", communicates with the controller 44 of the system associated with each attraction in one implementation associated with the information provided in FIGS. 4 and 5A-5H. FIGS. 7A-7C show a flow diagram illustrating a protocol by which the controller 44 communicates with the master server 102.

FIG. 8 schematically illustrates a system in which validation of park entry tickets and establishment of the entitlement of a customer to access the second queue 26 is centralized. In this embodiment, a customer obtains a ticket, whether prepurchased or purchased at the gate. A central park admission controller and database 200 stores information regarding valid tickets. A customer is permitted to enter the park via a turnstile 202 or other monitored entry when the customer's ticket is validated. For example, the customer's ticket may be read by a ticket reader 204 and the data thereon verified by the park admission controller 200 against the stored ticket information.

When a customer wishes to obtain an assigned time to access a second queue of an attraction, the customer establishes an entitlement via a first validator 232. The first validator 232 communicates with the central park admission controller 200 via a master controller 244. This arrangement permits a determination that the customer's ticket is valid for a specific day, has not been revoked or the like. If the ticket is validated, then the customer may be provided a pass, such as described above, by a media distributor 238. The master controller 244 is also arranged to send data to the central park admission controller 200 that a pass has been issued to the customer for that attraction. Then, if the customer attempts to gain a pass for that or another attraction while the first pass is outstanding, the database associated with the park admission controller 200 has a record of the outstanding pass and the customer will be denied the additional pass.

Again, an algorithm processor 250 is arranged to communicate with the master controller 244 to provide times to be assigned and printed by the media distributor 238.

In one or more embodiments, the system may be arranged so that not all customers are entitled to access the attraction 22 via the second queue. In another embodiment, one or more customers may be permitted to access certain attractions via the second queue and other attractions only via the first queue. In one or more embodiments, only customers which pay a premium amount or obtain some special entitlement are permitted to access one or more attractions via the second queue.

As shown in FIGS. 14*a* 14*c* and 14*e* there is a prior art system where three different Fastpass tickets are provided for three different rides each with a designated time and there is sufficient time between each of the Fastpass tickets.

In FIGS. 14*b*, 14*d*, and 14*f* there is provided three Fastpass tickets, with each ticket provided with respective different options. The guest can choose which of the tickets is to be used. Each ticket has multiple options on each ticket. In any given format the times for each ride on each ticket do not overlap. In other situations the times can be provided in an overlap format.

Operation, Effect and Other Features

In operation, in one or more embodiments, a customer receives a ticket or other entitlement. For example, at an amusement park, a customer pays for a ticket to gain entry to the park. With respect to the embodiment of the disclosure illustrated in FIG. 3, the main server 104 stores information regarding the customer's ticket.

At some point a customer may wish to access a particular attraction 22. When the customer reaches the attraction, they are presented with an option. First, the customer may access the attraction through the traditional first queue 24. Optionally, the customer may access the attraction 22 via the second queue.

Figure 9:
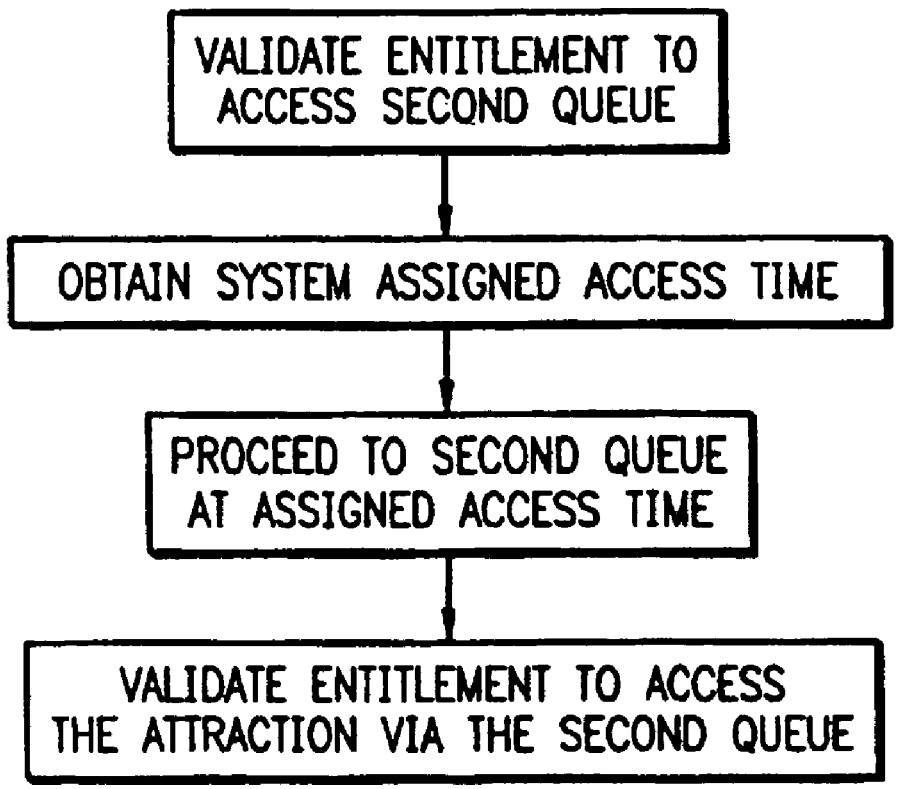
FIG. 9 is a flow diagram illustrating an embodiment of a method of the disclosure.

Referring to FIG. 9, if the customer wishes to access the attraction 22 via the second queue 26, the customer first validates entitlement to receive an assigned time to access the second queue 26. In one embodiment, the customer slides a portion of his ticket through a card reader portion of the first validator 32. In one or more other embodiments, validation may be performed by scanning a fingerprint or the like as described above.

In the arrangement illustrated in FIG. 3, the first validator 32 then sends a confirmation request through the local server 48 to the main server 104. The main server 104 verifies that the ticket is on the list of valid tickets. If the ticket is not verified, then the main server 104 sends this data back to the first validator 32 which may illuminate or print out an indication of such to the customer. In an embodiment where the customer is not entitled to more than one pass or entitlement to a second queue at a time, the first validator 32 is configured to verify that the customer has no other outstanding entitlements/passes.

In one embodiment, such as in the system illustrated in FIG. 2, if the ticket is verified, the first validator 32 sends a signal of such to the media distributor 38. The media distributor 38 then issues a pass to the customer. The pass includes an assigned access time at which the customer is entitled to return to the attraction 22 in the future and access the attraction 22 through the second queue 26.

The customer may then leave the area of the attraction 22. During this time, the customer may shop, eat or engage in a wide variety of other activities.

At the appointed time, the customer returns to the attraction 22 and seeks access to the attraction via the second queue 26. The customer establishes entitlement to access the attraction via the second validator 34. In the embodiment where the customer is provided with a pass which provides access, the customer presents the issued pass to a person who verifies the current time and the time printed on the pass, the date of the pass and the attraction for which the pass provides access. If validated, then the customer is permitted to access the attraction 22. As provided above, the customer may establish entitlement to access the attraction in accordance with other methods, such as by scanning a fingerprint again.

In one or more embodiments, the customers gaining access to the attraction through the first and second queues may be separated. For example, for a ride having four cars, the first two cars may be filled with customers from the first queue 24 and the second two cars filled with customers from the second queue 26. In one or more embodiments, the customers gaining access to the attraction 22 are integrated in accordance with the allocated capacity to the first and second queue customers.

In one or more embodiments, one or more customers may be permitted to access an attraction via the second queue 26 apart from the standard method of establishing entitlement at the first validator 32 and then returning to the second queue 26 of the attraction at the assigned time. For example, one or more passes may be issued to a number of customers which include pre-assigned times. One or more customers might, for example, be issued passes on the same day or days or weeks before the assigned date of access. A customer arranging a trip to a theme park may be permitted to purchase passes. In one or more embodiments, these assigned "spots" are accounted for by the system when determining other passes to issue to those accessing the attraction with the first validator.

In one or more embodiments, one or more customers may be permitted to access an attraction via the second queue 26 or even a third queue without a pass. For example, special VIP, disabled or other customers may be permitted to access the attraction via the second queue 26 or a third queue which permits the customer to access the attraction at any time.

As described above, in one or more embodiments of the system and method a customer is prevented from obtaining more than one entitlement or pass for accessing an attraction at a single time. In another arrangement, some customers may be permitted to obtain multiple passes. In one embodiment, the system may be arranged to permit customers to obtain multiple passes at some times and not at others. For example, if the wait time for accessing one or two attractions is particularly long (whether by the first or second queue 24, 26) the system may be arranged to permit customers to obtain passes for different attractions so that the customer avoids the need to access one attraction before obtaining a pass for accessing another attraction.

Advantageously, the method and system of the present disclosure permits one or more customers to gain access to an attraction without having to wait in a standard line to access the attraction. This permits the customer to engage in other activities instead of waiting in line. Such activities may comprise shopping or eating.

In one or more embodiments, the method and system advantageously permits "real-time" adjustment of the flow of customers to the attraction 22 via the first and second queues. This is advantageous since it permits optimization of the capacity of the attraction with the demand of customers. In the event the line of customers in the first queue 24 becomes excessively long, the system can provide for an adjustment in the number of customers permitted to access the attraction 22 via the second queue 26 and thus reduce the wait time associated with the first queue. In addition, in the event the capacity of the attraction 22 suddenly decreases, the system can provide for an adjustment in the number of customers and/or access times via the second queue 26 to prevent a build up of customers accessing the attraction 22 via the first and/or second queues. In the event the capacity of the attraction 22 increases, the system can provide for an additional number of customers to access the attraction 22 via the second queue 26 and/or adjust the access times to permit more customers to access the attraction.

Models

The attendance and use profiles can be fed into the computer system to provide advantages for modeling and planning the flow of patrons in the entertainment venue.

1. There is the ability to forecast return times so as not to disadvantage the day guest. This is to minimize the impact to Day Guests, and on first-in first-out guests.
2. There will be better inventory control through more information driving the inventory availability is possible. These include:
   a. The ability to dynamically change/tune the algorithms to maximize yield by adding factors to the model:
      i. as they are discovered;
      ii. made available in an automated fashion (e.g. no-shows, weather forecast feeds, current resort occupancy, current or projected park attendance, ride capacity, etc.);
   b. The ability to dynamically change availability for resort and day guests;
   c. The ability to adjust by day which attractions is offered.

Figure 4:
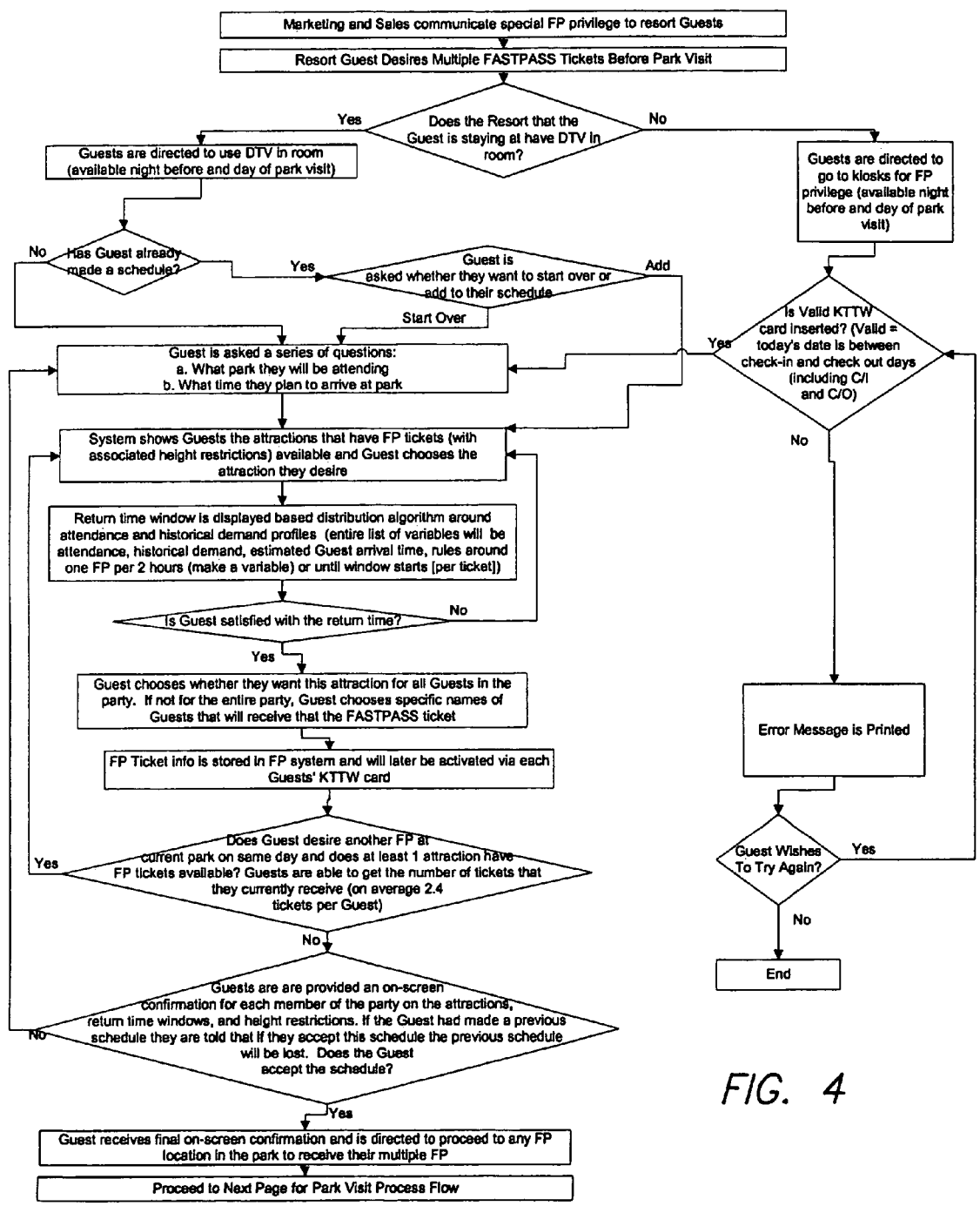
FIG. 4 is a flow diagram illustrating a management system where multiple tickets are granted on a long-term basis, the tickets being received before visiting a park.
Figure 5:
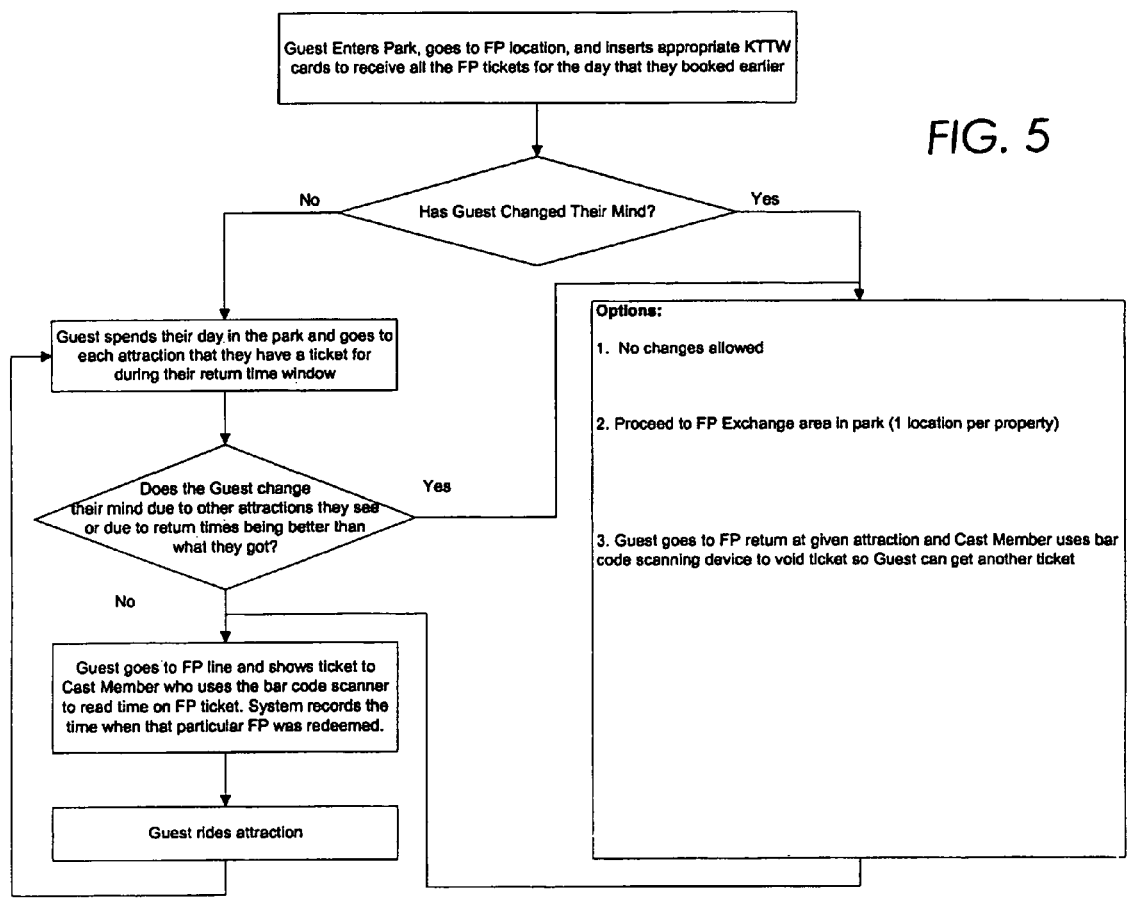
FIG. 5 is a flow diagram illustrating the management of a system where multiple tickets are granted on a long-term basis, the tickets being obtained when visiting the park.

The exemplary process of FIG. 4 starts with the marketing and sales department of an organization operating in an entertainment environment communicating that a special Fastpass privilege is available to resort guests. This communication is transmitted preferably wirelessly, through the Internet or other network, and communicated to guests resident at resort properties associated with the entertainment environment. A guest then indicates the desirability of multiple Fastpass tickets before a visit to a park which is the entertainment environment.

Television Fastpass

There is a next determined whether the resort has rooms with a digital TV ("DTV") in the room. If yes, the guest is directed to use the DTV in their room of occupancy. This availability to use Fastpass can be provided on the night before or the day of the park visit. If the guest has already made a schedule, then the guest is asked whether or not they want to start over and add to their schedule. The guest can then be asked a series of questions related to Fastpass.

If the guest does not have a schedule, then the guest is asked a series of different questions. These can relate to which park is being attended and what time they intend to arrive at the park. The guest then chooses the appropriate Fastpass tickets that are desired. Having effected that, the return time window is displayed based on a distribution algorithm around the attendance and historical demand profiles.

The guest can be given a time slot to use the Fastpass and different rules can be applied to Fastpass allocation as required. If the guest is satisfied with the return time, the guest is given the option of choosing whether the attraction is for all guests or for selected guests in the party. The Fastpass ticket would then be stored in the system and can later be activated by each guest's KTTW ("Key To The World" card or pass is a trademark of Disney Enterprises, Inc).

The guest can be asked whether another Fastpass is required at the current park on the same day for other attractions and different numbers of tickets can be issued.

The guest can be provided with on-screen confirmation for each member of the party. Return time windows and height restrictions can be made available to the guest so that the guest has full information necessary to enable them to be informed and make appropriate decisions on whether or not to accept this schedule.

Ultimately, the guest can receive a final on-screen confirmation and be directed to any Fastpass location in the park to receive the multiple Fastpasses.

In situations where there is no DTV, the guest is directed to go to a kiosk for Fastpass privileges. These kiosks can be located in a common area at a resort or a hotel associated with the resort. When a valid KTTW card is inserted, meaning that the dates check out with the available dates, then the guest is taken through a series of questions similar to that where there is a DTV in the system. If the dates do not check out, an error message is printed and the guest can try again.

Different hierarchical models can be established for the ability and right to obtain and use the Fastpass according to different priorities.

1. Guest
   a. Spending per guest at hotels can determine different hierarchies of access to Fastpass. Thus, the more that is spent by a patron, the higher the priority can be for Fastpass.
   b. Hotel accommodation in related resorts and environments associated with the entertainment center are allocated different priorities. Where a patron is in a related hotel, a higher priority can be given.
   c. Different levels and hierarchies can be applicable at different hotels. Thus, more luxurious hotels can have higher priorities.
2. Seasonal differences can be factored into the grant of different privileges. Accordingly, special promotions for Fastpass can be provided according to the season.

Segmentation

Different hierarchical models can be established for the ability and right to obtain and use the Fastpass according to different priorities.

1. Guest
   a. Spending per guest at hotels can determine different hierarchies of access to Fastpass. Thus, the more that is spent by a patron, the higher the priority can be for Fastpass.
   b. Hotel accommodation in related resorts and environments associated with the entertainment center are allocated different priorities. Where a patron is in a related hotel, a higher priority can be given.
   c. Different levels and hierarchies can be applicable at different hotels. Thus, more luxurious hotels can have higher priorities.
2. Seasonal differences can be factored into the grant of different privileges. Accordingly, special promotions for Fastpass can be provided according to the season.

Guest Value Features

By providing remote access at different early times, there can be different advantages and benefits.

1. Early Fastpass Access
   a. There is the ability to offer guests early access to Fastpass via their in-room TV, (DTV or hotel kiosk), to select the attractions for a Fastpass is required.
      i. The ability to access this access may be variable, such as the night before, day of prior to entertainment park open, and day of after park opens.
   b. Pre-Arrival
      i. The Fastpass may be obtainable via the WEB from a remote location such as a home computer
         1. The Fastpass may be supplied as printed paper tickets 2. the Fastpass may be supplied electronically and wirelessly through a download to a PDA or cellular telephone
2. Multiple Fastpass accesses for Resort guests is possible
   a. Each Guest per room is able to select same or separate Fastpass as others in the room. As each attraction is selected Guest can select which Guests want that selection.
   b. The ability to offer different numbers (i.e. more than 3, could be variable) of Fastpass based on segmentation.
3. There is the ability to offer premium return times based on segmentation.
4. There is the ability to let segmented guests have first chance to certain inventory.
5. There is the ability to allow guests with parkhopper entitlements to choose a Fastpass for a second park on the same day.
6. There is the ability to issue a concurrent Fastpass for the day guest (with long virtual waits).

Mobile System
Wireless Reservations

Patrons are permitted priority access to one or more attractions by a prior allocation of a space to the attraction through use of a personal wireless device such as a cellular telephone. A particular advantage of a cellular telephone is that it is a standard wireless communication means inexpensively accessible to many customers, and is indeed a device, which is essentially becoming common place and owned and used regularly by consumers internationally. Cellular telephones are becoming the standard and common form of mass communication wirelessly, and as such the application of the disclosure is particularly directed to the cellular telephone form of wireless mobile communication device. Other mobile communications devices could be used, however the preferred application is for the cellular telephone, which is workable preferably for keying activation and/or voice actuation.

A patron of an attraction can conveniently use their cellular telephone in order to gain access to an attraction. The cellular telephone is preferably capable of sending and receiving e-mail or text messages. Alternatively, the cellular telephone is preferably capable of retrieving and viewing Internet Web pages or data.

The patron first registers with the reservation system. This may be done in a number of ways. For example, the patron manually enters an identifier from their ticket, such as a ticket number, onto the keypad of their cellular phone. This identifier is then sent to a web site. A central computer validates that the ticket number or other identifier is a ticket issued on that day. This avoids the situation where a person accesses the web site and requests access to attractions when they are not going to be present in the park that day. Once a patron has been validated, messages are returned to their cellular telephone prompting patrons to choose from at least one of a plurality of attractions available for making reservations.

Alternatively, an employee at the entertainment venue may use a device such as a scanner to read information on the patron's ticket. This eliminates any need for the patron to manually enter a ticket number into the telephone. This information may be associated with the patron's telephone number or other unique identifier associated with their personal wireless device and sent to a central computer. The patron then receives a message on their cellular telephone prompting them to choose from at least one of a plurality of attractions for reserving access.

Once a patron has been successfully validated or registered with the system, the system recognizes their personal wireless device for an allotted time period. For example, the allotted time period may be for the amount of time the ticket is good, such as one day. The patron can then communicate back-and-forth, requesting reservations to an attraction, and receiving validation of their reservation.

In an exemplary embodiment, validation is received in the form of a barcode image displayed on the cellular telephone display screen. The patron then uses the cellular telephone at the entrance of the attraction to validate their access to the ride by holding it up to a barcode scanning device.

In other embodiments, other media such as a paper ticket may be used. The patron would go to a media generator to pick up their ticket. A bar code can be provided on the paper ticket.

The use of the Fastpass system in a mobile sense with a wireless device such as a cellular telephone is now further described.

Figure 10:
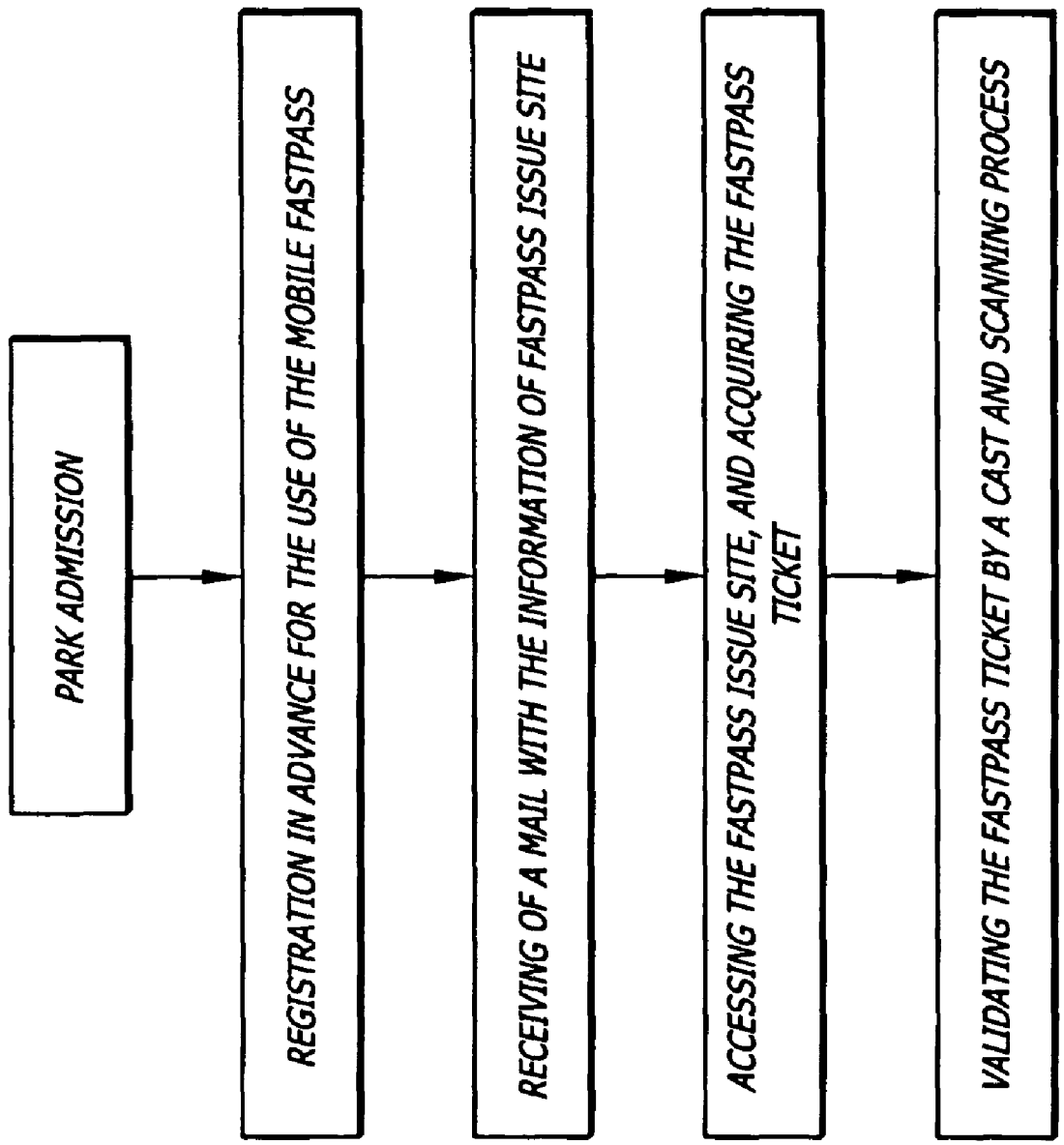
FIG. 10 is a process flow diagram illustrating a mobile Fastpass system.

As is shown in FIG. 10, a guest would enter a process to obtain park admission electronically, as illustrated in FIG. 10. The cellular telephone is preferably capable of sending and receiving e-mail or text messages. Alternatively, the cellular telephone is preferably capable of retrieving and viewing Internet Web pages or data. This operation of the cellular telephone or wireless device can be effected by keying in requests, responding to prompts on a screen or orally. As such the device can include voice recognition software or other similar capabilities.

More detail of a system in accordance with the present disclosure is shown in FIGS. 11 and 12.

Generally, an admission is purchased and issued to a patron entering an entertainment environment. In one embodiment, the admission ticket data is scanned to the entertainment venue. Admission ticket data for the day is made available to the Fastpass system, granting those patrons who have purchased tickets access to the system for that day. Thereafter, a cellular telephone is used to interface with the system.

A user uses selection means on the telephone to select the different attractions for which the user requires a Fastpass ticket. Return times are then provided by the computer system operating the loading on the attraction and other attractions in the entertainment environment. When a Fastpass ticket is acquired, a barcode or other such signal is provided to the cellular telephone, which can then be used at the attraction when using the Fastpass to access the attraction. Information about the issued Fastpass is then presented to the user including indications as to when the Fastpass is available for use, such as being in or out of time, whether the Fastpass can be used for more than one patron and/or whether the Fastpass can be used multiple times.

One scenario of use is allocating different percentages of Fastpass to different users. For example, a percentage of the capacity of an attraction capacity is allocated to wireless (cellular) Fastpass in addition to a percentage allocated to Fastpass distribution at the attraction. There may be another percentage allocated to a remote kiosk, in-room TV, or over the internet. This allocation scheme facilitates the overall Fastpass capacity being used by different means of access and prevents the full capacity of an attraction from being sold out by any one means of access. For example, if the full Fastpass capacity of a popular attraction was available for hotel room guests using a cell phone, their TV or the internet, it could be sold out before the park evens opens, preventing other guests going directly to the park from accessing the attraction. Therefore, the system allocates a percentage of the capacity during each time period for each means of access, and controls the percentage of capacity split between the first and second queues.

General

Many other examples of the disclosure exist, each differing from others in matters of detail only.

Of course, the foregoing description is that of one or more embodiments of the disclosure, and various changes and modifications may be made without departing from the spirit and scope of the disclosure, as defined by the claims.

We claim:

1. A method of managing the loading by patrons of multiple attractions in an entertainment environment via computer wherein different patrons are permitted access to the attraction on at least two bases, firstly, a first-in first-out basis, and secondly, on a priority basis established by a prior allocation of access time to the attraction comprising:
    permitting a patron of an attraction priority access to a first attraction;
    the priority access being effected by permitting application through an entry of a request for an allocation of a time to access the first attraction including the steps of:
        receiving an input from a patron, the input being communicated to a central computer for regulating the load of the first attraction;
        making available to the patron potential return times for the first attraction determined by the computer; and
        receiving in the central computer a selection by the patron of one of the available return times, the one of the available return times defining a first time period; and
    providing to the patron from the computer an additional priority entry at a second time selected by the patron to any one of the multiple attractions in the entertainment environment, such additional entry being effected on a priority basis, wherein the second time selected by the patron defines a second time period, the first time period being adjacent to the second time period by an intervening time period, the intervening time period being about ten percent to thirty percent of the first time period and the second time period.

2. A method as claimed in claim 1 wherein the patron additionally is permitted to select one of the available return times for each of multiple different attractions allocated on a priority basis.

3. A method as claimed in claim 1 wherein the additional entry is obtained by the patron at no additional cost.

4. A method as claimed in claim 1 wherein the input is received from a remote location, the input being received from a telephone keypad.

5. A method as claimed in claim 1 wherein the input is received selectively through a TV control, IVR, touch screen or distribution unit.

6. A method as claimed in claim 1 wherein the priority is redeemed through a selected automatic procedure, such procedure being the reading of one of a RF identification, reading of a magnetic code or barcode allocated to the patron.

7. A method as claimed in claim 1 wherein the priority is redeemed at a time of entry into the environment or the attraction in the environment.

8. A method as claimed in claim 1 including a computing process to determine the mix ratio of numbers of accesses granted to the priority access and non-priority access, and feeding back redemptions of the priority accesses such that near real time updates of availability for further granting of accesses may be computed.

9. A method as claimed in claim 1, wherein the priority basis is further determined depending on at least three of whether the application is made through a mobile system, a TV based application, an internet based application, a hotel access or an on site request.

10. A method as claimed in claim 1, wherein the priority basis is further determined depending on at least four of whether the application is made through a mobile system, a TV based application, an internet based application, a hotel access or an on site request.

11. A method of managing the loading by patrons of multiple attractions in an entertainment environment wherein different patrons are permitted access to the attraction on at least two bases, firstly, a first-in first-out basis, and secondly, on a priority basis established by a prior allocation of a time to access the attraction comprising:
    permitting a patron of an attraction priority access to a first attraction, the priority access being effected by permitting application through an entry of a request for an allocation of a priority time to access a space on the first attraction including the steps of:
        receiving an input from a patron, the input being communicated to a central computer for regulating the load of the first attraction;
        providing to the patron available return times for the first attraction determined by the computer; and
        receiving at the computer a selection by the patron of one of the available return times, such available return times defining a first time period; and
    permitting application through an entry of a request for a priority allocation of a time to access a space on a second attraction including the steps of:
    receiving an input from a patron, the input being communicated to a central computer for regulating the load of the second attraction;
    providing to the patron available return times for the second attraction; and
    receiving in the central computer for regulating the load of the second attraction a selection by the patron of one of the available return times, such available return times defining a second time period; and
    providing the patron with an entry determined by the computer at a second time period selected by the patron to the second attraction in the entertainment environment, the first time period being adjacent to the second time period by an intervening time period, the intervening time period being about ten percent to thirty percent of the first time period and the second time period.

12. A method as claimed in claim 11 wherein the first time period is overlapped by the second time period for half of an overall time period as defined collectively by the first time period and the second time period.

13. A method as claimed in claim 11 wherein the first time period is overlapped by the second time period for a quarter of an overall time period as defined collectively by the first time period and the second time period.

14. A method as claimed in claim 11 wherein there is at least a third time period subsequent to the first and second time periods.

15. A method as claimed in claim 11 wherein there is at least a third time period subsequent to the first and second time periods and wherein the third time period is separated from the second time period by an intervening time period.

16. A method as claimed in claim 11 wherein the input is received from a remote location, the input being received from a telephone keypad.

17. A method as claimed in claim 11 wherein the input is received selectively through a TV control, IVR, touch screen or distribution unit.

18. A method as claimed in claim 11 wherein the priority is redeemed through a selected automatic procedure, such procedure being the reading of one of a RF identification, reading of a magnetic code or barcode allocated to the patron.

19. A method as claimed in claim 11 wherein the priority is redeemed at a time of entry into the environment or the attraction in the environment.

20. A method as claimed in claim 11 including a computing process to determine the mix ratio of numbers of accesses granted to the priority access and non-priority access, and feeding back redemptions of the priority accesses such that near real time updates of availability for further granting of accesses may be computed.

21. A method of managing the loading of patrons to multiple attractions in an entertainment environment wherein different patrons are permitted access to the attraction on at least two bases, firstly, a first-in first-out basis, and secondly, on a priority basis
    established by a prior allocation of a space to the attraction comprising: permitting a patron priority access to a first attraction;
    the priority access being effected by permitting application through an entry of a request for an allocation of a space on the first attraction including the steps of:
        receiving an input from a patron, the input being communicated to a central computer for regulating the load of the first attraction;
        communicating with the patron about available return times for the first attraction determined by the computer; and
        receiving from the patron a selection of one of the available return times; and
    providing the patron with the priority access determined by the computer, the priority access being allocated depending on at least three of whether the application is made through a mobile system, a TV based application, an Internet based application, a hotel access, or an on site request.

\* \* \* \* \*